US012678815B1

(12) United States Patent
Angles et al.

(10) Patent No.: US 12,678,815 B1
(45) Date of Patent: Jul. 14, 2026

(54) DEVICE AND METHOD FOR REPEATEDLY INSTALLING DRIP IRRIGATION EMITTERS

(71) Applicants:Jacob Angles, Paso Robles, CA (US); Ricardo Tan, Davis, CA (US)

(72) Inventors: Jacob Angles, Paso Robles, CA (US); Ricardo Tan, Davis, CA (US)

(73) Assignee: Jake Angles, Paso Robles, CA (US)

( * ) Notice: Subject to any disclaimer, the term of this patent is extended or adjusted under 35 U.S.C. 154(b) by 0 days.

(21) Appl. No.: 19/059,785

(22) Filed: Feb. 21, 2025

(51) Int. Cl.
| | |
|---|---|
| *A01G 25/02* | (2006.01) |
| *B05B 1/02* | (2006.01) |
| *B05B 13/02* | (2006.01) |

(52) U.S. Cl.
CPC ............ B05B 13/02 (2013.01); A01G 25/026 (2013.01); B05B 1/02 (2013.01)

(58) Field of Classification Search
CPC .................................................. A01G 25/026
See application file for complete search history.

(56) References Cited

U.S. PATENT DOCUMENTS

| | | | |
|---|---|---|---|
| 2,315,209 A | 3/1943 | Kost | |
| 3,526,944 A | 9/1970 | Cherup | |
| 4,535,925 A * | 8/1985 | Ramey | ................... B21J 15/323 |
| | | | 29/811.2 |
| 4,769,891 A | 9/1988 | Corral | |
| 4,793,226 A | 12/1988 | Kress | |
| 5,177,846 A | 1/1993 | Bryant | |

| | | | |
|---|---|---|---|
| 5,324,379 A | 6/1994 | Eckstein | |
| 5,722,142 A | 3/1998 | Myers | |
| 5,893,201 A | 4/1999 | Myers | |
| 5,926,947 A | 7/1999 | Takano | |
| 6,148,507 A * | 11/2000 | Swanson | ................ B21J 15/105 |
| | | | 29/811.2 |
| 6,343,616 B1 | 2/2002 | Houtchens | |
| 6,381,821 B1 | 5/2002 | Panyon, Jr. | |
| 6,430,767 B1 | 8/2002 | Ramos | |
| 6,581,262 B1 | 6/2003 | Myers | |
| 6,901,643 B1 | 6/2005 | Krasner | |
| 6,951,153 B2 | 10/2005 | Berthlaume | |
| 7,185,409 B1 | 3/2007 | Myers | |
| 8,850,933 B2 | 10/2014 | Amouroux | |
| 8,898,876 B2 | 12/2014 | Feith | |
| 10,071,449 B1 | 9/2018 | Donofrio | |
| 10,391,512 B1 | 8/2019 | Samuel | |
| 10,420,293 B2 | 9/2019 | Zakarian | |
| 11,370,087 B2 | 6/2022 | Birkeland | |
| 12,520,776 B2 * | 1/2026 | Angles | ................ A01G 25/026 |
| 2005/0060864 A1 | 3/2005 | Nikolaidis | |

(Continued)

FOREIGN PATENT DOCUMENTS

| | | |
|---|---|---|
| AU | 2005202094 A1 | 12/2005 |
| FR | 2550722 A1 | 3/1989 |
| GB | 2154170 A1 | 9/1985 |

*Primary Examiner* — Sarang Afzali
(74) *Attorney, Agent, or Firm* — TMB Law; Timothy M. Brown

(57) ABSTRACT

The invention provides a device and method for repeatedly installing drip irrigation emitters into drip irrigation tubing. The device can be provided with a magazine capable of holding a plurality of drip irrigation emitters. The magazine feeds individual drip irrigation emitters to a plunger and sleeve arrangement that cooperate to guide the drip irrigation emitters through the device's housing and into a section of drip irrigation tubing.

18 Claims, 23 Drawing Sheets

(56)                    References Cited

U.S. PATENT DOCUMENTS

| 2006/0248702 | A1 | 11/2006 | Nikolaidis |
| 2011/0016682 | A1 | 1/2011 | Wood |
| 2012/0248759 | A1 | 10/2012 | Feith |
| 2015/0336224 | A1 | 11/2015 | Lui |
| 2018/0338434 | A1 | 11/2018 | Wlassich |
| 2024/0224900 | A1 | 7/2024 | Angles |

* cited by examiner

DEVICE AND METHOD FOR REPEATEDLY INSTALLING DRIP IRRIGATION EMITTERS

FIELD OF THE INVENTION

The invention generally relates to drip irrigation. More particularly, the invention relates to devices and methods for installing drip irrigation emitters.

BACKGROUND

Drip irrigation emitters provide an efficient means for irrigating a wide variety of crops. Drip irrigation emitters conserve water as their water delivery is restricted to root zones where water is required for crop growth and maintenance. Large crop fields that are irrigated by drip irrigation require an immense number of drip irrigation emitters. Drip irrigation emitters are currently installed by a user creating a hole in drip irrigation tubing with a tool, and manually pressing a barbed inlet on the drip irrigation emitter into the hole in the tubing. Other means for installing drip irrigation emitters include handheld tools which are manually loaded with a single drip irrigation emitter which is then pressed into drip irrigation tubing using the tool. Thus, current means for installing drip irrigation emitters are inefficient as they require a series of manual steps and install only a single emitter at a time. This inefficiency can be profound in commercial farming operations where large crop fields require the installation of thousands of drip irrigation emitters.

What is needed in the art therefore is a device and method for quickly and efficiently installing drip irrigation emitters.

SUMMARY OF THE INVENTION

The invention provides a device and method for repeatedly installing drip irrigation emitters. The inventive device includes a removable magazine for housing a plurality of drip irrigation emitters. The magazine feeds the emitters to a plunger which drives the emitters into a section of drip irrigation tubing under the guidance of a sleeve that is in slidable arrangement with the plunger. With the drip irrigation emitter installed in the section of tubing, the plunger and sleeve retract within the device such that the magazine feeds a subsequent emitter into position to be driven into another section of drip irrigation tubing under the force of the plunger and guidance of the sleeve.

Figure 1:
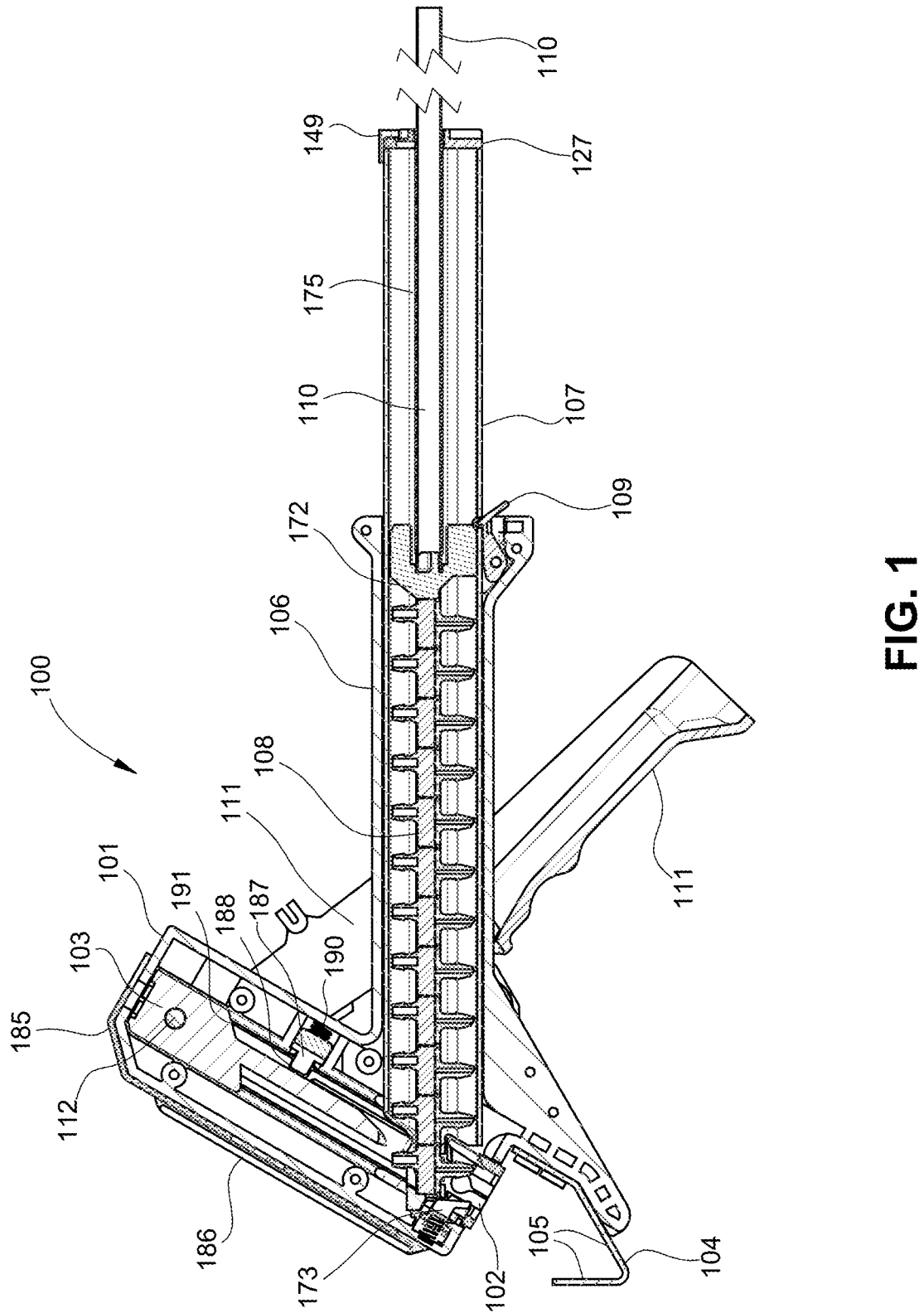
FIG. 1 shows a cross-sectional view of an embodiment of the inventive device in a resting state.

The figures referred to above are not necessarily drawn to scale and should be understood to present a representation of the invention, illustrative of the principles involved. Some features of the device and components depicted in the drawings may be enlarged or distorted relative to others to facilitate explanation and understanding. The same reference numbers are used in the drawings for similar or identical components of the inventive device. The device and components, as disclosed herein, will have configurations determined, in part, by the intended application and environment in which the inventive device is used.

DETAILED DESCRIPTION

The invention provides a device and method for repeatedly installing drip irrigation emitters. The device comprises a plunger, sleeve, and magazine adapted to contain a plurality of drip irrigation emitters. Drip irrigation emitters are fed from the magazine to the sleeve which holds the drip irrigation emitter in a stable orientation which enables the plunger to advance the emitter through the body of the device towards the forward end of the device where the emitter is driven into a section of drip irrigation tubing.

FIG. 1 shows a cross-sectional view of an embodiment of the inventive device in a resting state. Device 100 includes housing 101 having sleeve 102 slidably disposed within housing 101, with plunger 103 being slidably disposed within sleeve 102. Housing 101, including handle 106, can be formed from a pair of opposing halves that are secured to one another by fasteners, such as rivets or screws, for example. Device 100 includes cradle 104 coupled to the forward end of housing 101. Cradle 104 is adapted to receive and hold a section of drip irrigation tubing in a stable, rigid orientation such that the inlet of a drip irrigation emitter can be driven into the section of tubing by plunger 103 without the section of tubing collapsing inward upon itself.

Cradle 104 can assume a configuration wherein opposing cradle sides 105 are at an acute angle with respect to one another. As shown in FIG. 1, cradle 104 can have a small elliptical bottom portion. However, it will be appreciated that cradle 104 can assume other shapes. For example, the bottom of cradle 104 can assume a shape wherein cradle sides 105 form an acute angle wherein the bottom of cradle 104 forms a vertex where cradle sides 105 converge. It will also be appreciated that cradle 104 can assume a "C" shape wherein cradle sides 105 and the bottom of cradle 104 form an ellipse. Cradle 104 can be secured to housing 101 by fasteners, such as screws or rivets, for example. Cradle 104 can be made of a metal or metal alloy, such as stainless steel, for example.

The device includes handle 106 which is adapted to receive magazine 107, while magazine 107 is adapted to receive a plurality of drip irrigation emitters 108. Handle 106 and housing 101 can be formed from a single, continuous material. Magazine 107 can have a capacity of up to five, up to 10, up to 15, or more drip irrigation emitters. Handle 106 is pivotably connected to magazine latch 109 which is adapted to retain magazine 107 within handle 106 by interacting with notch 150 in body 141 of magazine 107. Magazine 107 includes magazine rod 110 internally within magazine 107, wherein the top end of magazine rod 110 terminates in magazine follower 172 which is adapted to contact the lowermost drip irrigation emitter within magazine 107. Magazine rod 110 and magazine follower 172 are removable from magazine 107. Magazine rod 110 can be a rigid elongate body that is in mechanical communication with, and enshrouded by, magazine spring 175. Magazine spring 175 is fixed to magazine rod base 127 which has a through hole for permitting the lower portion of magazine rod 110 to slide through magazine rod base 127 as drip irrigation emitters 108 are fed through magazine 107. Compression of magazine spring 175 provides force to magazine follower 172 such that magazine follower 172 maintains contact with the lowermost drip irrigation emitter within magazine 107 thereby forcing the advance of emitters housed within the magazine towards sleeve 102. While the device is shown in use with the magazine assembly disclosed herein, it will be appreciated that the device can be practiced with the corresponding magazine assembly shown and described in U.S. patent application publication No. 2024/0224900 A1, the entire contents of which are incorporated herein by reference for all purposes.

The external opposing surfaces of handle 106 are pivotably connected to trigger 111 so as to permit trigger 111 to function as a fulcrum for driving sleeve 102 and plunger 103 towards cradle 104 when trigger 111 is compressed towards handle 106. Trigger 111 is maintained in mechanical connection with sleeve 102 and plunger 103 by plunger pin 112. FIG. 1 shows the device in a resting state wherein trigger 111 is held in an open position under the tension of a pair of springs 120 on the opposing sides of the device which are fixed to the device by a pair of spring housings. To achieve an active state, trigger 111 is compressed towards handle 106 thereby compressing springs 120 and causing plunger 103 to slidably advance with sleeve 102 towards cradle 104 causing the forward end of plunger 103 to contact a drip irrigation emitter housed within the end of magazine 107. Continued compression of trigger 111 causes plunger 103 to continue its advance through sleeve 102 such that the drip irrigation emitter rotates within the end of magazine 107 and becomes flush with the forward end of plunger 103 as the emitter begins to exit from the upper end of magazine 107.

As the drip irrigation emitter leaves magazine 107 under the force of plunger 103, the sides of the emitter are aligned with an aperture in the forward end of sleeve 102. This orientation permits the emitter to be pressed into the aperture under the force of plunger 103 without the emitter wobbling or binding. Continued compression of trigger 111 causes plunger 103 to continue its travel through sleeve 102 and the upper end of magazine 107, whereupon plunger pin 112 contacts the forward end of a pair of sleeve slots within sleeve 102 leading plunger 103, sleeve 102 and the drip irrigation emitter retained within the aperture to travel together through housing 101 towards cradle 104. This arrangement stabilizes the travel of the emitter through the device so that the inlet of the emitter can be driven straight into a section of drip irrigation tubing within cradle 104 without the emitter tilting or wobbling out of its alignment with plunger 103. The components, assembly and interaction of the magazine, sleeve and plunger are set forth in greater detail in the following non-limiting description.

Figure 2:
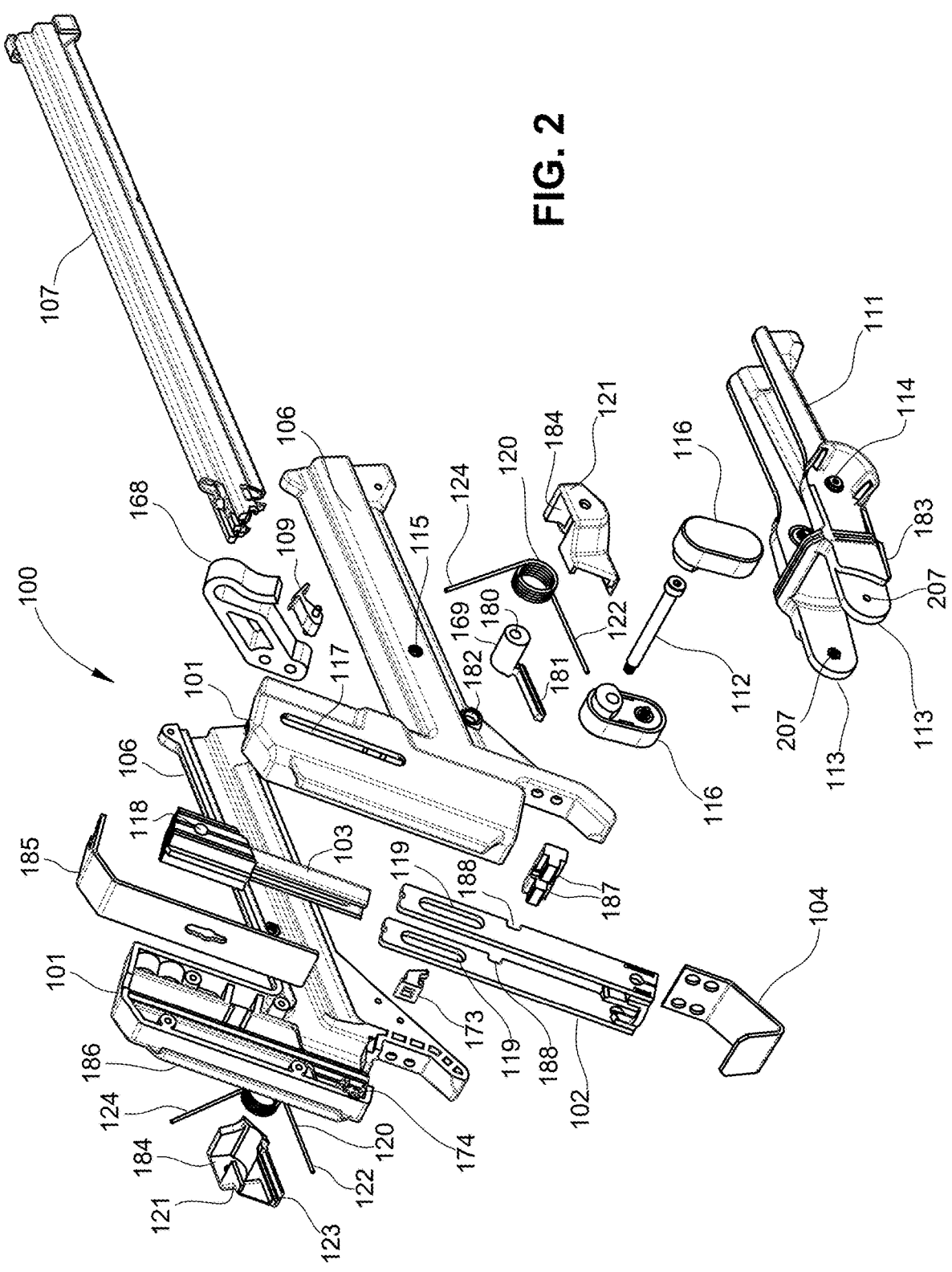
FIG. 2 shows an exploded view of an embodiment of the inventive device.

FIG. 2 shows an exploded view of device 100 including housing 101, sleeve 102, plunger 103, cradle 104, handle 106, magazine 107, magazine latch 109, and trigger 111. Trigger 111 features a pair of opposing trigger ears 113 which straddle the outside of housing 101 in the device's assembled state. Trigger 111 is pivotably connected to handle 106 by a pair of opposing trigger screws 114 which thread into trigger screw threads 115 on handle 106. Trigger 111 is mechanically connected to plunger 103 through a pair of opposing linking bodies 116 which are pivotably connected to trigger ear openings 207 in trigger ears 113 by fasteners, such as by screws that thread into trigger ear openings 207. Linking bodies 116 are in pivotable, mechanical communication with plunger 103 through plunger pin 112 which traverses housing 101 through a pair of opposing housing slots 117 which traverse the opposing sides of housing 101. Each of linking bodies 116 can have on their outward facing surfaces a cover that encloses the ends of pin 112 and the fasteners that fix trigger 111 to trigger ear openings 207 when the device is in its assembled state. In the device's assembled state, plunger 103 is slidably disposed within sleeve 102 which is slidably disposed within housing 101, while plunger pin 112 traverses housing slots 117, sleeve slots 119, and plunger pin opening 118 so as to place trigger 111 in mechanical communication with plunger 103 and sleeve 102 through linking bodies 116.

Trigger 111 is maintained in an open position in the device's resting state through tension provided by a pair of springs 120 which are disposed on the opposing outsides of housing 101 when the device is in its assembled state. Thus, springs 120 force trigger 111 away from handle 106 to maintain the device in an open, resting state. In the device's assembled state, springs 120 are individually contained within spring housings 121 along with spring retainers 169. Spring retainers 169 have spring mounts 180 which form an extension with a through hole. Spring retainers 169 include receiving grooves 181 which face outward when the device is in its assembled state and are adapted to receive a length of spring ends 122. In the device's assembled state, springs 120 are disposed within spring housings 121 with spring mounts 180 traversing the circular openings of springs 120 and a length of spring ends 122 is nested between receiving grooves 181 on spring retainers 169 and receiving portions 123 which form grooves on the lower end of spring mounts 121. Spring ends 124 are disposed outside of spring housings 121 and exit spring housings 121 through spring housing openings 184 on the upper sides of spring housings 121. Screws traverse the aperture in spring housings 121, the circular opening of springs 120, and the aperture of spring mounts 180 and thread into threaded openings 182 on handle 106 to mount spring housings 121, springs 120 and spring retainers 169 to handle 106 on opposing sides of the device. In the device's assembled state, the terminal ends of spring ends 122 can be secured in openings on the lower opposing sides of the forward end of housing 101. Spring ends 124 are slidably received in a pair of ear receiving grooves 183 on the opposing, forward facing surfaces of trigger ears 113 such that compression and release of trigger 111 permits spring ends 124 to slide within receiving grooves 183. Springs 120, spring housings 121, and spring retainers 169 can form an assembled, modular unit that can be removed and replaced without otherwise disassembling the inventive device, thereby allowing a user to easily clean springs 120 if debris accumulates from field use or replace springs 120 when their function is compromised due to spring fatigue. Device 100 can include clip 168 connected to housing 101 so as to permit the device to be detachably connected to an object, such as the belt or pocket of a user, or a hook or peg on a tool board.

Still referring to FIG. 2, device 100 can further include ejector 173. Ejector 173 nests inside ejector mount 174 in housing 101. Ejector mount 174 forms a recess in housing 101 and is adapted to receive the profile of the upper portion of ejector 173. Ejector 173 is adapted to eject a drip irrigation emitter from sleeve 102 when the sleeve retracts within housing 101 while retaining an emitter that was not driven into a section of drip irrigation tubing under the force of plunger 103 as described in further detail under FIGS. 12-14. Thus, ejector 173 is adapted to prevent uninstalled emitters from binding against the next, top emitter housed within magazine 107 when the device returns to its resting state while retaining an emitter in sleeve 102.

As shown in FIG. 2, device 100 can incorporate drip irrigation fitting removal tool 185. Drip irrigation removal tool 185 can be secured to the device by a pair of opposing tool mounts 186 which form tracks into which the arm portion of drip irrigation fitting removal tool 185 slides into when the device is in its assembled state. In preferred embodiments, drip irrigation fitting removal tool 185 matches the profile of the top and back of device 100 so as to provide a streamlined nesting connection.

As further shown in FIG. 2, device 100 includes a pair of independent locking blocks 187 which are adapted to nest within a pair of opposing sleeve notches 188 located on the underside of sleeve 102. Locking blocks 187 are received within locking block mounts 189 which form recesses within housing 101. Locking block springs 190 are located beneath locking blocks 187 within locking block mounts 189 in the device's assembled state and provide upward force against locking blocks 187 to advance locking blocks 187 towards sleeve 102. With device 100 in its assembled state, locking blocks 187 function to ensure sleeve 102 is fully retracted when the device is in its resting state. Locking blocks 187 further function to prevent the forward movement of sleeve 102 during the activation states described in FIGS. 5 and 6 to permit plunger 103 to drive a drip irrigation emitter into the forward end of sleeve 102.

Figure 3:
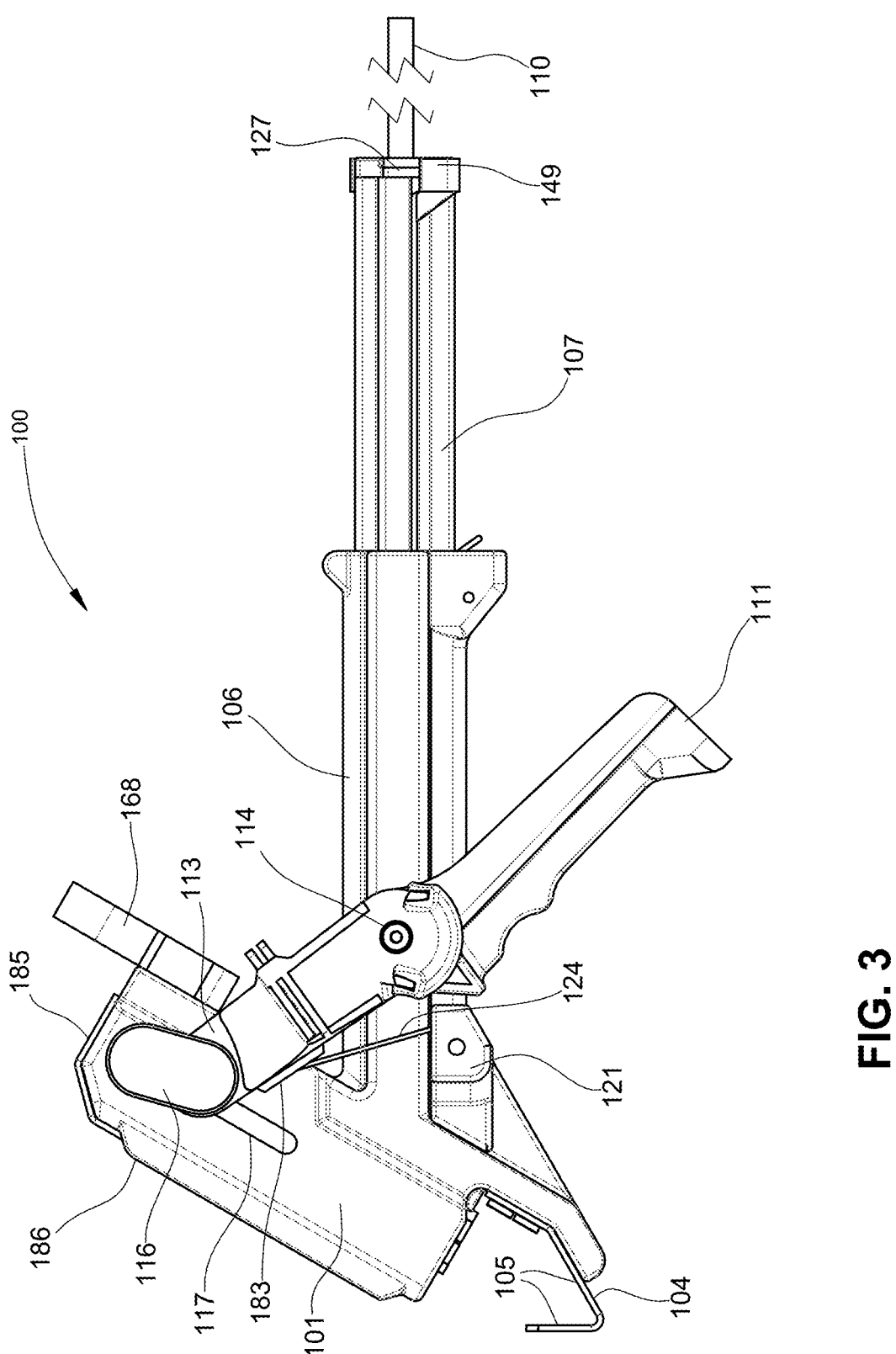
FIG. 3 shows a side view of an embodiment of the inventive device in an assembled, resting state.

FIG. 3 shows an embodiment of device 100 in an assembled state with housing 101 coupled to cradle 104 and handle 106 pivotably connected to trigger 111 by trigger screws 114. Trigger 111 is pivotally connected to linking bodies 116, while clip 168 is coupled to housing 101. It will be appreciated that in this assembled state, linking bodies 116 place trigger 111 in mechanical communication with sleeve 102 and plunger 103 by plunger pin 112 which traverses housing slots 117, sleeve slots 119 and plunger pin opening 118. Magazine 107 is shown installed within handle 106. FIG. 3 shows the device in its resting state with trigger 111 fully extended away from handle 106. Drip irrigation fitting removal tool 185 is shown secured to device 100 by tool mounts 186.

Figure 4:
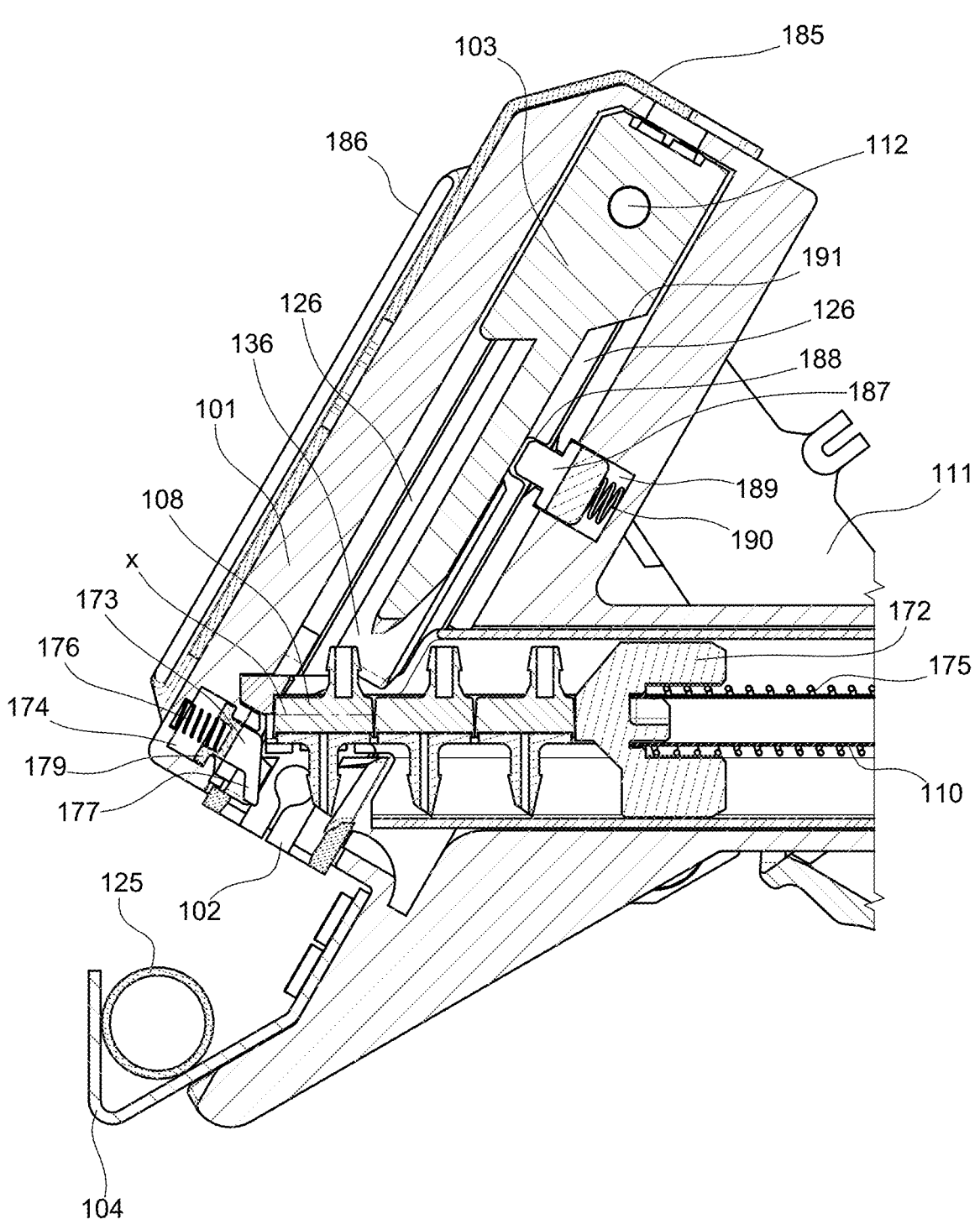
FIG. 4 shows a cross-sectional view of an embodiment of the inventive device in a resting state.

FIG. 4 shows a cross-sectional view of device 100 in a resting state wherein magazine 107 is installed within handle 106 such that the upper end of magazine 107 is disposed between sleeve arms 126 of sleeve 102. Uppermost drip irrigation emitter 108 is held in magazine aperture 144 in the end of magazine 107 by magazine follower 172. Plunger 103 and sleeve 102 remain in a retracted state under the tension of springs 120 with plunger pin 112 contacting the rearward surfaces of sleeve slots 119. In the device's resting state, plunger 103 preferably does not contact uppermost drip irrigation emitter 108 and the rearward end of plunger 103 contacts the inside rear surface of housing 101 under the force of springs 120. Uppermost drip irrigation emitter 108 is housed within magazine aperture 144 in the end of magazine 107 such that the lower surface of the emitter having the barbed inlet is orientated towards the forward end of the device where cradle 104 is located, while the upper surface of the emitter with the spout is oriented towards plunger 103.

In the device's resting state, horizontal axis X of drip irrigation emitter 108 is oriented at an angle with respect to plunger ends 137 which form the forward end of plunger ram 136. Locking blocks 187 occupy sleeve notches 188 under the force of locking block springs 190 so as to secure sleeve 102 in its rearward position for receiving drip irrigation emitter 108 in sleeve aperture 129 in the forward end of sleeve 102 under the force of plunger 103.

While device 100 is depicted with handle 106 coupled to housing 101 at an angle, it will be appreciated that the invention can be practiced with the device wherein handle 106 is coupled to housing 101 at a 90-degree angle such that the longitudinal axis of handle 106 and the longitudinal axis of housing 101 are perpendicular to one another. In such an arrangement, the compression of trigger 111 will cause plunger 103 to come into contact with drip irrigation emitter 108 such that the upper surface of the emitter is flush with the plunger ends 137 on plunger ram 136. That is, horizontal axis X of drip irrigation emitter 108 will be parallel to the surfaces of plunger ends 137 when the device is in its resting state.

Figure 5:
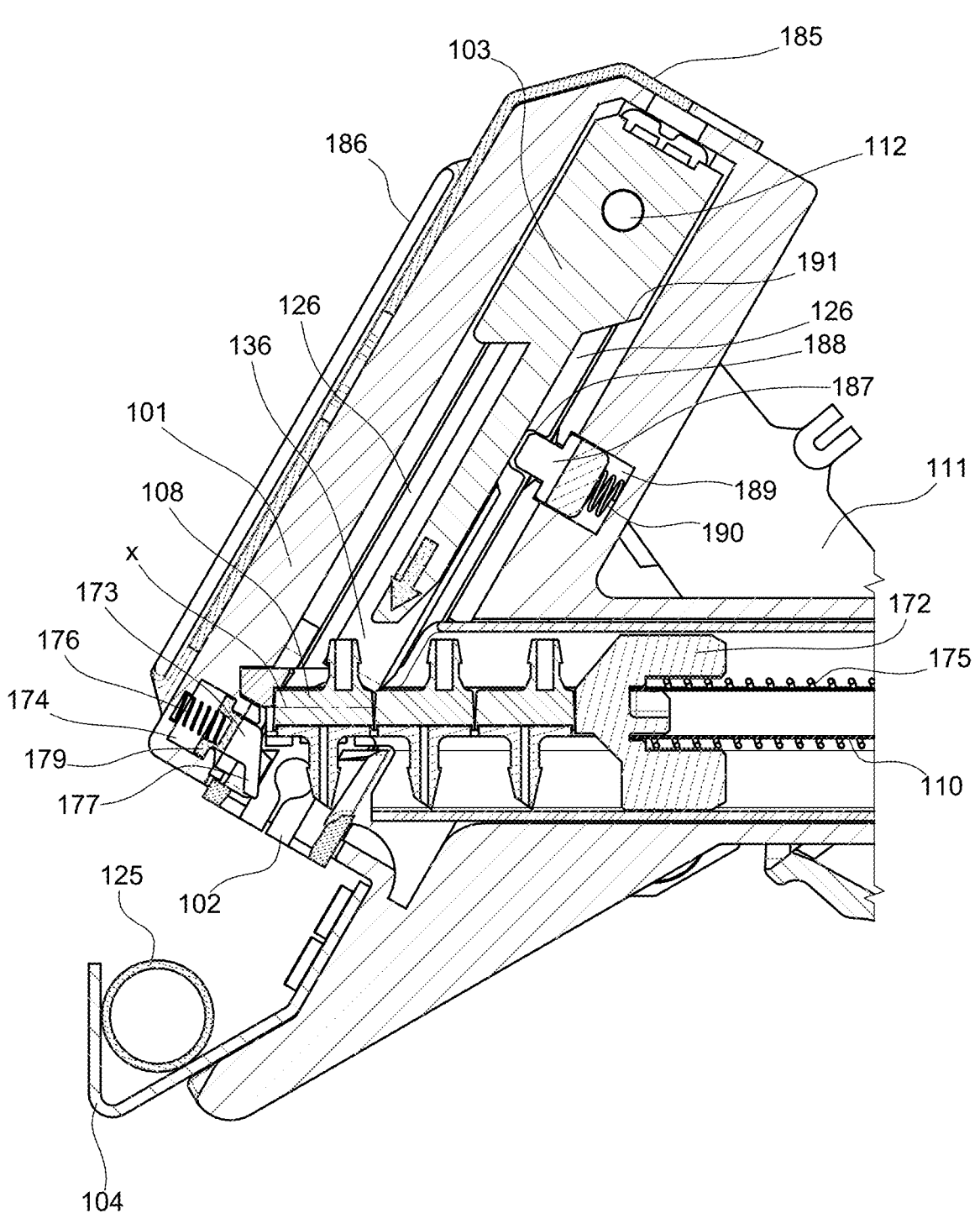
FIG. 5 shows a cross-sectional view of an embodiment of the inventive device in a first activation state.

FIG. 5 shows a cross-sectional view of device 100 in a first activation state wherein compressing trigger 111 towards handle 106 causes plunger 103 to travel between sleeve arms 126 towards cradle 104 such that the lower surface of plunger ends 137 of plunger ram 136 contacts drip irrigation emitter 108 while the emitter remains housed within magazine aperture 144 in the end of magazine 107. In this first activation state, horizontal axis X of drip irrigation emitter 108 remains at an angle with respect to plunger ends 136. Locking blocks 187 remain within sleeve notches 188 under the force of locking block springs 190 maintaining sleeve 102 in its rearward position.

Figure 6:
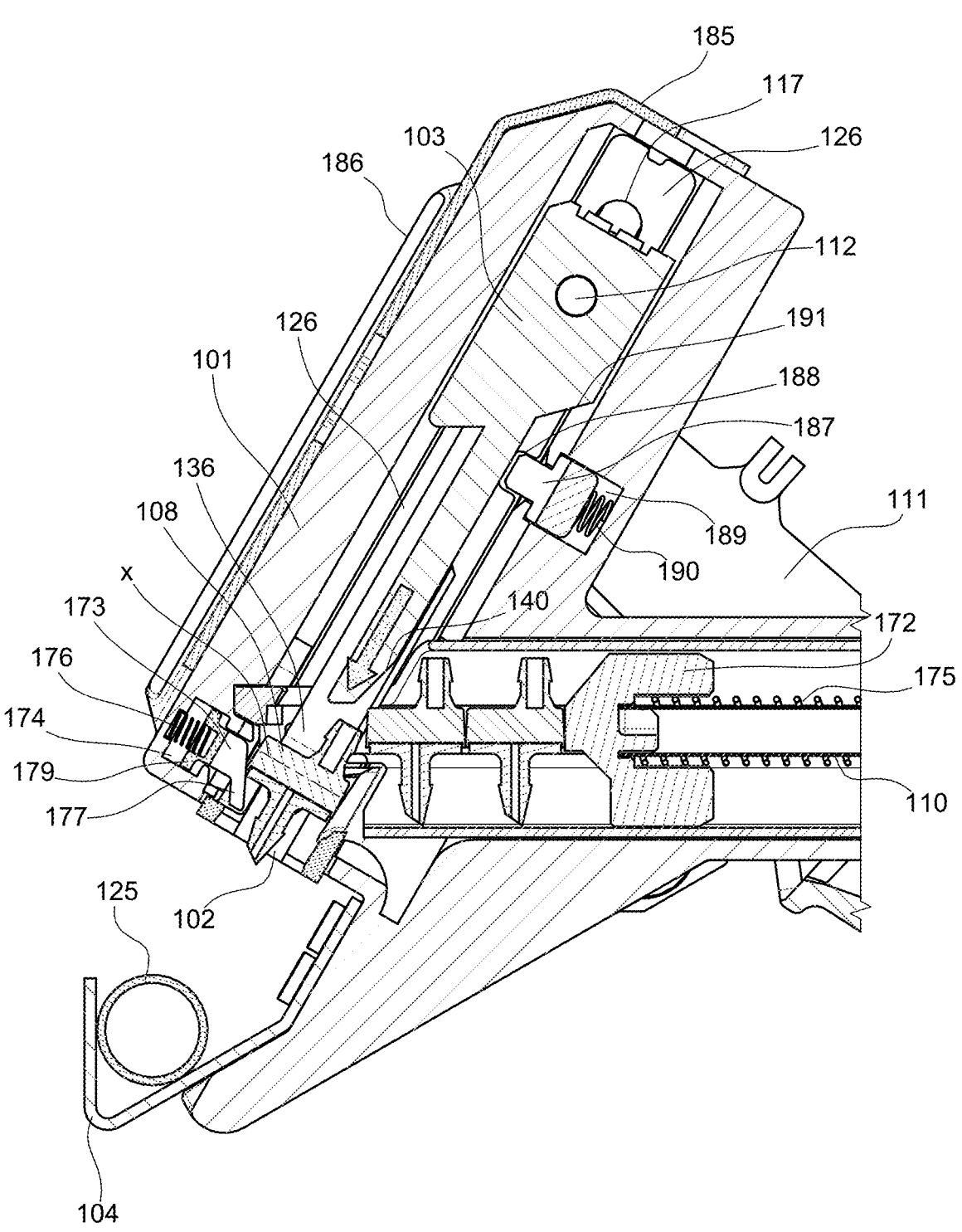
FIG. 6 shows a cross-sectional view of an embodiment of the inventive device in a second activation state.

FIG. 6 shows a cross-sectional view of device 100 in a second activation state wherein trigger 111 is further compressed towards handle 106 causing plunger ram 136 to further advance between sleeve arms 126 and through magazine aperture 144 in the end of magazine 107 causing drip irrigation emitter 108 to rotate within magazine aperture 144 such that horizontal axis X of the emitter assumes a position that is parallel to plunger ends 137 as drip irrigation emitter 108 travels from magazine aperture 144 towards sleeve aperture 129 in the forward end of sleeve 102 under the force of plunger 103. As drip irrigation emitter 108 travels from magazine aperture 144 under the force of plunger 103, the sides of the emitter are aligned with sleeve aperture 129. Meanwhile, locking blocks 187 continue to occupy sleeve notches 188 and prevent the forward movement sleeve 102 such that emitter 108 can be forced into sleeve aperture 129 in an interference fit.

Figure 7:
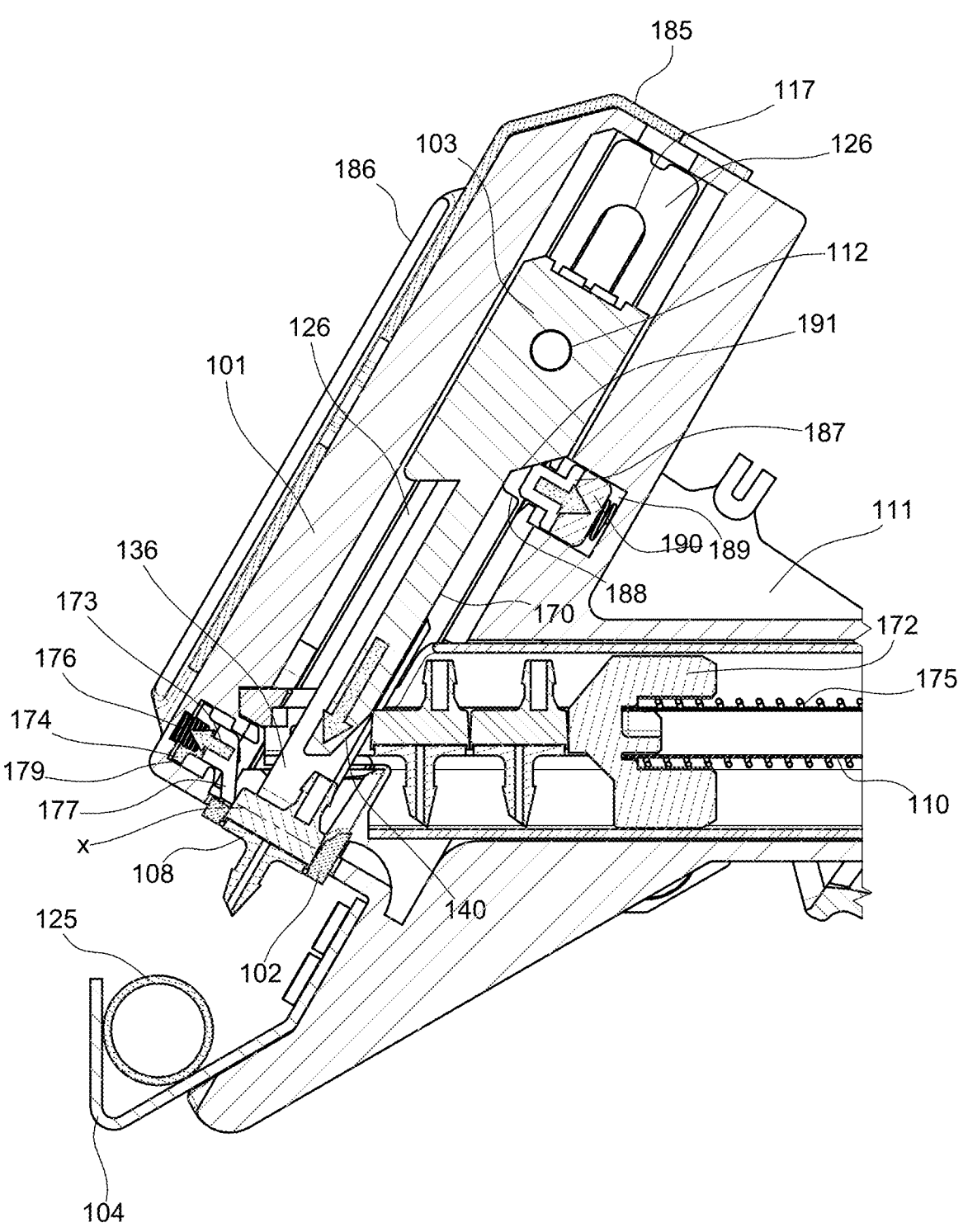
FIG. 7 shows a cross-sectional view of an embodiment of the inventive device in a third activation state.

FIG. 7 shows the device in a third activation state wherein continued compression of trigger 111 causes drip irrigation emitter 108 to leave magazine aperture 144 such that side of drip irrigation emitter 108 contacts the lower biased surface of ejector 173. Under the force of plunger 103, drip irrigation emitter 108 slides against the lower biased surface of ejector 173 causing ejector 173 to ascend into ejector mount 174 thereby compressing ejector spring 176. As the side of drip irrigation emitter 108 clears ejector shoe 177, the emitter is pressed into sleeve aperture 129 in the forward end of sleeve 102 such that the emitter is retained sleeve aperture 129 under an interference fit. In this third activation state, plunger pin 112 contacts the forward ends of sleeve slots 119 within sleeve arms 126 such that continued compression of trigger 111 causes plunger 103 and sleeve 102 with the retained emitter to advance together through housing 101 towards cradle 104. Simultaneously, locking blocks 187 are disengaged from sleeve notches 188 by biased surface 191 of plunger 103 contacting locking blocks 187 thereby compressing locking block springs 190 and forcing locking blocks 187 into locking block mounts 189 to permit the forward movement of sleeve 102 with drip irrigation emitter 108 retained in sleeve aperture 129. During this third activation state, plunger ramp 140 contacts the second emitter in magazine 107 and presses the emitter into the magazine to prevent the second emitter from interfering with the free travel of sleeve 102 and plunger 103.

Figure 8:
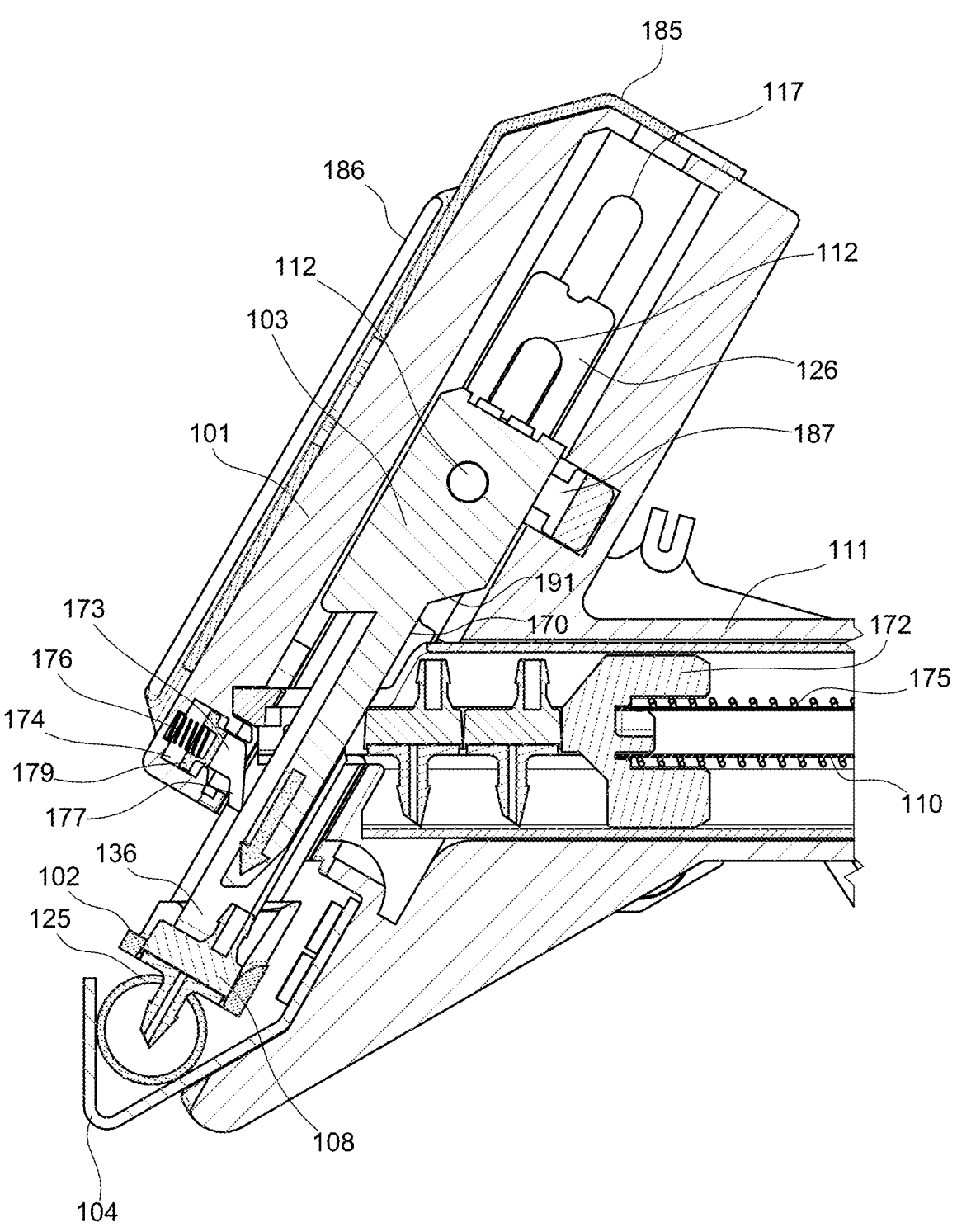
FIG. 8 shows a cross-sectional view of an embodiment of the inventive device in a fourth activation state.

FIG. 8 shows the device in a fourth activation state wherein continued compression of trigger 111 causes sleeve 102, plunger 103, and retained drip irrigation emitter 108 to continue their travel towards cradle 104 such that the forward ends of sleeve 102 and plunger ram 136 exit housing 101 to drive the barb of retained drip irrigation emitter 108 into section of drip irrigation tubing 125 under the force of plunger 103 thereby installing the emitter within the section of drip irrigation tubing.

In this fourth activation state, the upper side of drip irrigation emitter 108 has cleared ejector shoe 177 such that ejector 173 has descended within ejector mount 174 under the force of ejector spring 176. In this extended state, ejector shoe 177 is slidably engaged with the upper surface of plunger ram 136. Alternatively, ejector 173 can be held in an extended state by ejector shoulders 179 which contact the inside, lower surfaces of ejector mount 174 under the force of ejector spring 176 such that ejector shoe 177 remains suspended above the upper surface of plunger ram 136. In its extended state, ejector 173 is in a loaded position that permits it to eject an emitter that is retained in sleeve aperture 129 when sleeve 102 retracts into housing 101 without having installed the emitter into a section of drip irrigation tubing. By so ejecting uninstalled emitters from sleeve aperture 129, ejector 173 prevents uninstalled emitters from binding against the top emitter housed within magazine 107 thereby preventing the jamming of the device when sleeve 102 returns to its resting state. Locking blocks 187 remain in a retracted state within locking block mounts 189 due to locking blocks 187 contacting with the lower surface of the body of plunger 103.

Figure 9:
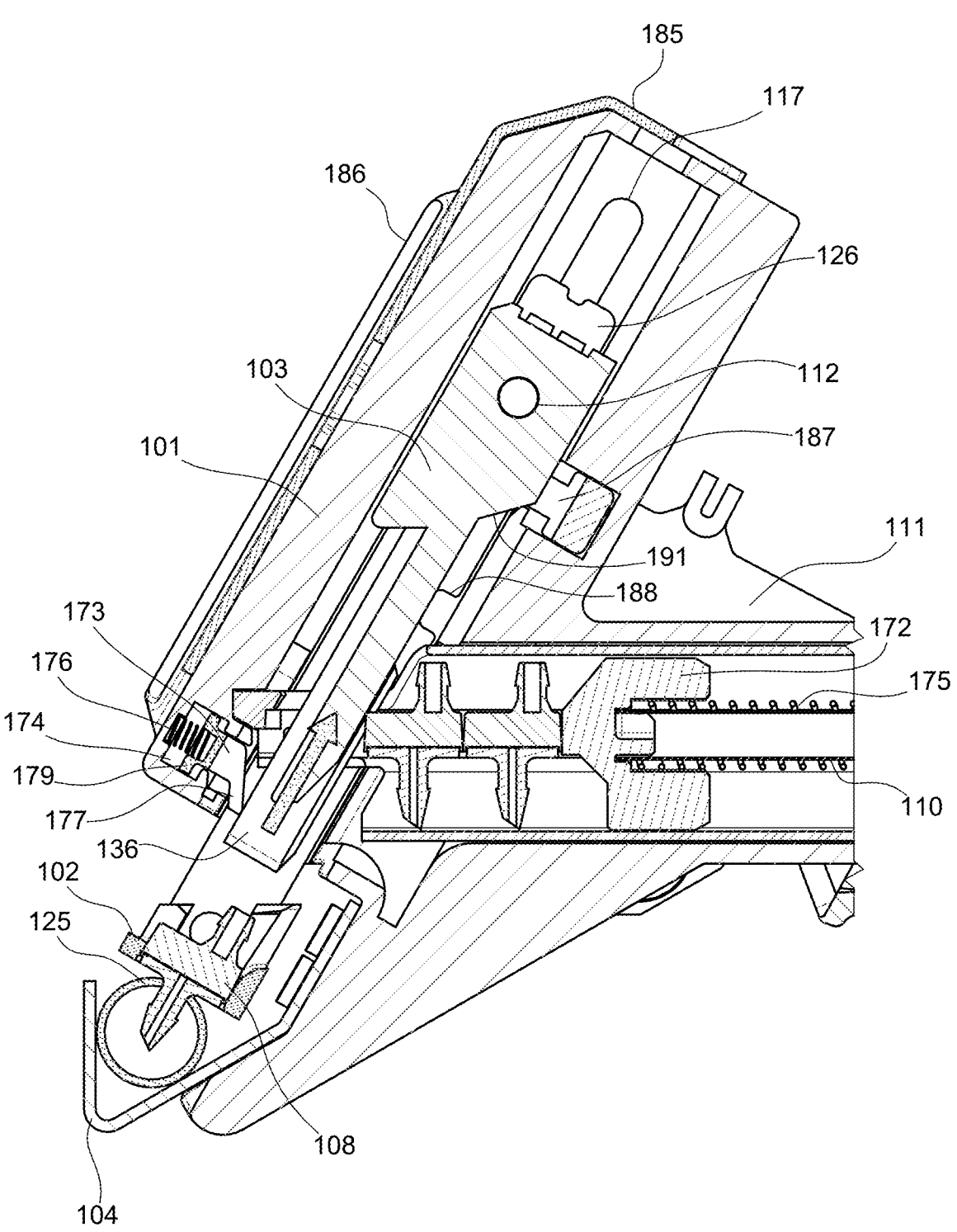
FIG. 9 shows a cross-sectional view of an embodiment of the inventive device in a first retraction state.

FIG. 9 shows the device in a first retraction state wherein relaxation of the user's grip on trigger 111 causes plunger 103 to retract within sleeve 102 and away from drip irrigation emitter 108 under the force of springs 120 which were loaded by the compression of trigger 111. In this first retraction state, sleeve 102 remains extended towards cradle 104, with the emitter remaining retained within the forward end of sleeve 102. Sleeve 102 is permitted to remain extended without retracting with plunger 103 due to the interference fit between the installed emitter and sleeve aperture 129 and the emitter being held firmly within drip irrigation tubing 125 by the emitter's barb. Sleeve 102 is permitted to remain in this extended state as plunger pin 112 is traveling freely through sleeve slots 119 within sleeve 102 as plunger 103 travels towards the rear of the device. Locking blocks 187 remain in a retracted state within locking block mounts 189 due to the continued contact of locking blocks 187 with the lower surface of the body of plunger 103.

Figure 10:
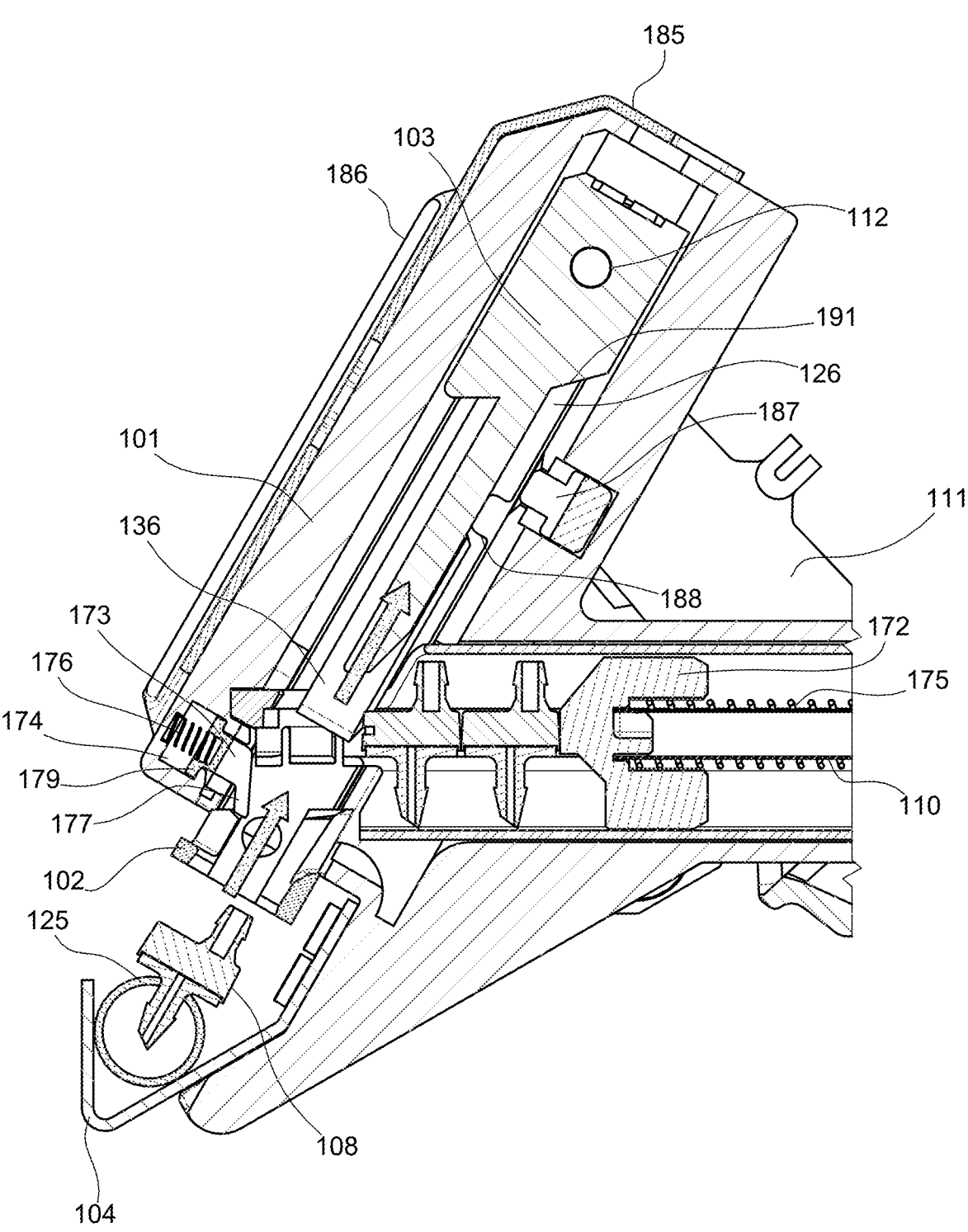
FIG. 10 shows a cross-sectional view of an embodiment of the inventive device in a second retraction state.

FIG. 10 shows the device in a second retraction state wherein continued relaxation of the user's grip on trigger 111 causes plunger 103 and plunger pin 112 to move towards the rear of the device under the force of springs 120 such that plunger pin 112 contacts the rear end of sleeve slots 119 causing sleeve 102 to begin to retract together with plunger 103 towards the rear of the device such that the forward end of sleeve 102 withdraws from drip irrigation emitter 108 which remains installed within irrigation tubing 125 due to the barbed spout of the emitter overcoming the interference fit between the emitter and sleeve aperture 129. Locking blocks 187 continue to remain in a retracted state within locking block mounts 189 due to the locking blocks 187 now contacting the lower surfaces of sleeve arms 126.

Figure 11:
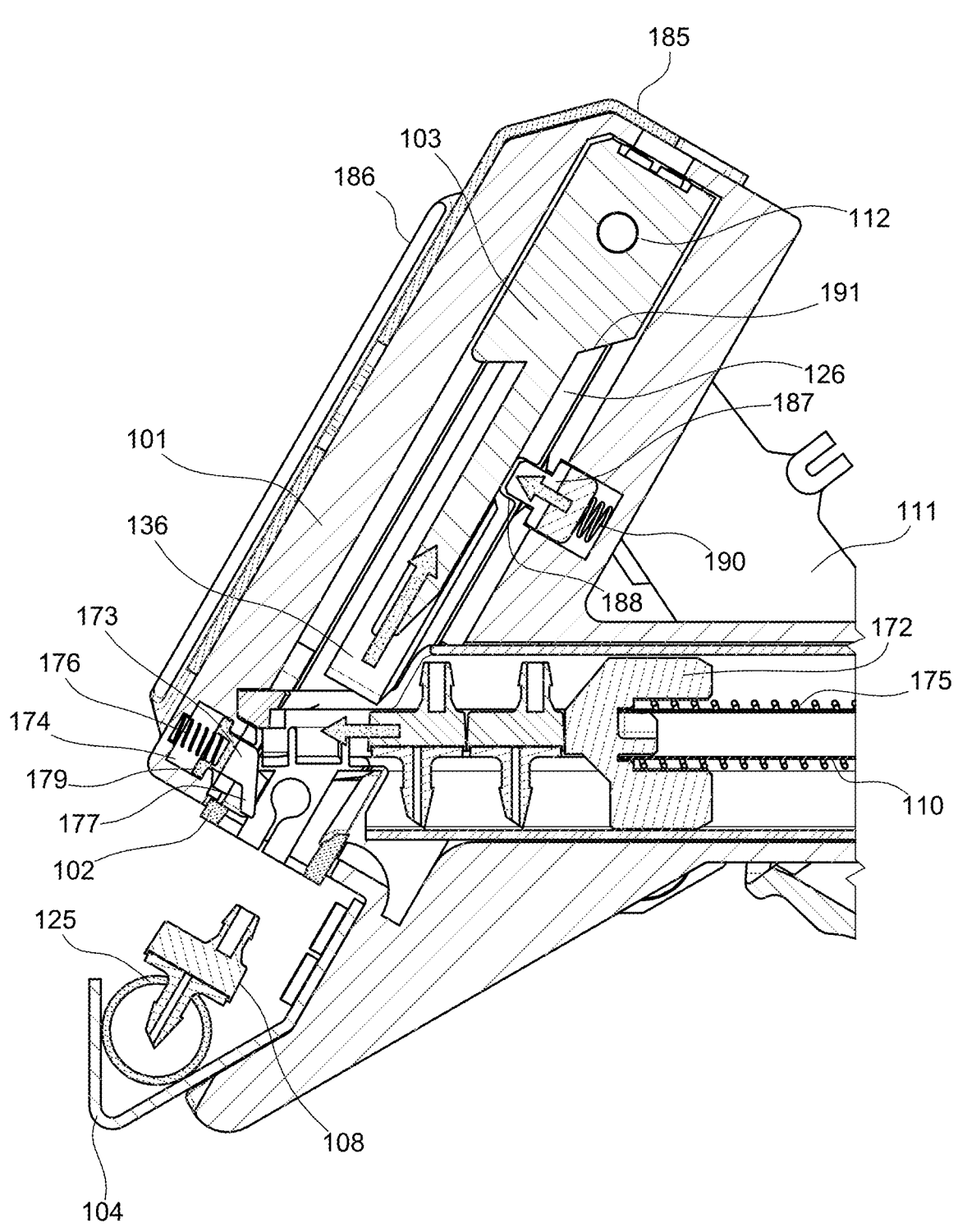
FIG. 11 shows a cross-sectional view of an embodiment of the inventive device in a third retraction state.

FIG. 11 shows the device in a third retraction state wherein continued relaxation of the user's grip on trigger 111 causes plunger 103 and sleeve 102 to further retract together towards the rear of the device such that plunger ram 136 clears magazine aperture 144 in the end of magazine 107 and the rearward end of sleeve 102 contacts the inside surface of housing 101 to allow a subsequent irrigation emitter to become nested within magazine aperture 144 under the force of magazine rod 110. Thus, the third retraction state enables the device to return to its resting state such that the device is ready to install a subsequent drip irrigation emitter. In assuming the resting state, the device's ejector 173 has resumed an extended state wherein ejector shoe 177 occupies ejector port 178 in sleeve 102 while ejector shoulders 179 are in contact with the inside surfaces of ejector mount 174. Locking blocks 187 have resumed a locking position and occupy sleeve notches 188 under the force of locking block springs 190. In assuming this locking position, locking blocks 187 assist in forcing sleeve 102 towards the rear of the device as a chamfered surface on the upper rear of locking blocks 187 pushes sleeve 102 rearwards as locking blocks 187 are forced into sleeve slots 188 by locking block springs 190 during the rearward travel of sleeve 102.

Figure 12:
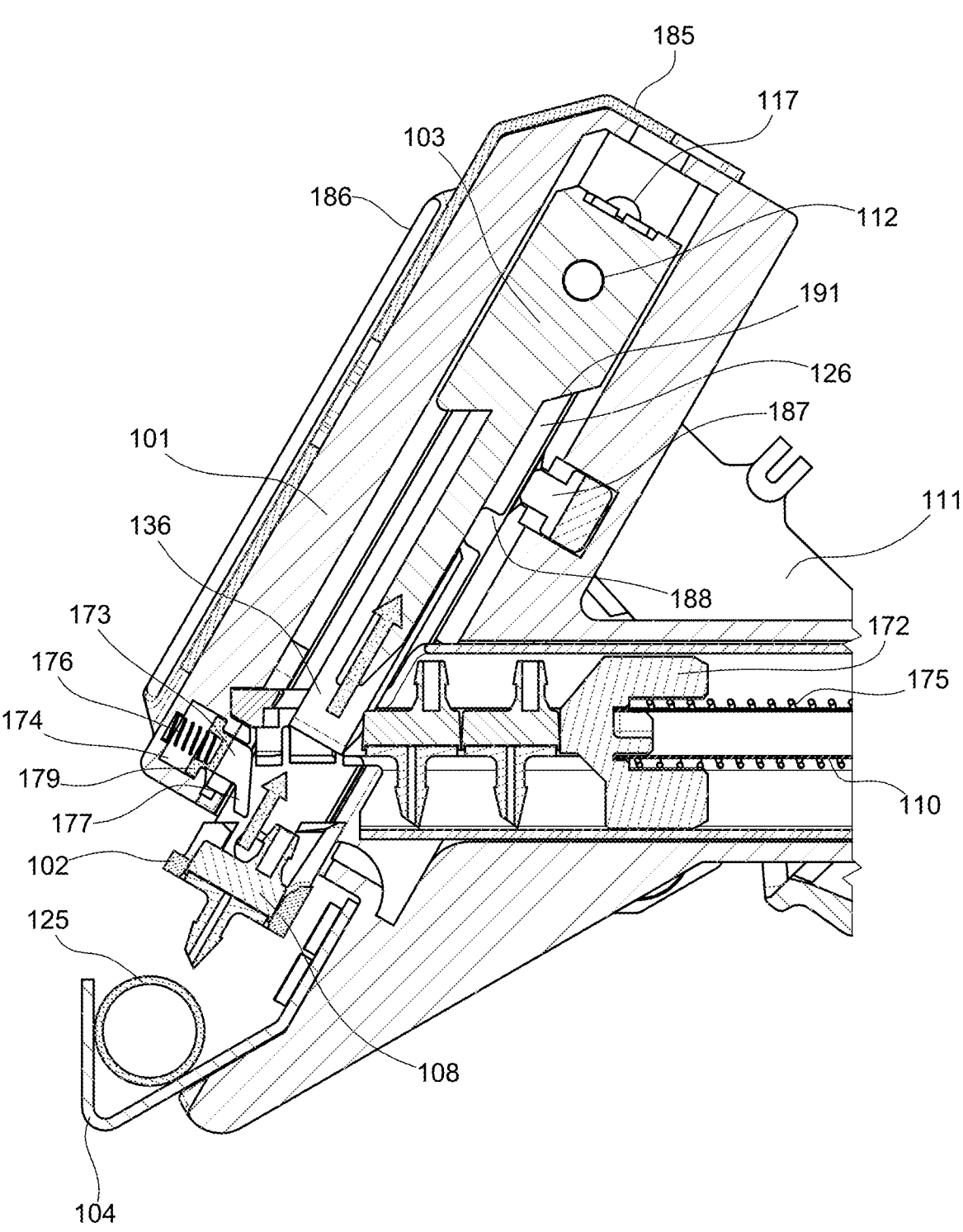
FIG. 12 shows a cross-sectional view of an embodiment of the inventive device in a first ejection state.

FIG. 12 shows the device in a first ejection state wherein sleeve 102 begins its rearward travel within housing 101 while drip irrigation emitter 108 remains retained in sleeve aperture 144 in the forward end of sleeve 102 due to the interference fit between the emitter and sleeve aperture 129. This situation can arise when the tool assumes the fourth activation state disclosed herein without the drip irrigation emitter having been installed, and held within, a section of drip irrigation tubing. For example, the device may have been placed into the fourth activation state without a section of drip irrigation tubing having been placed within cradle 104. Alternatively, the situation of an uninstalled emitter can arise due to a partial stroke of trigger 111, or the failure of the emitter inlet's barb to retain the emitter within a section of drip irrigation tubing after the inlet pierces the wall of the tubing. Ejector 173 is shown in an extended, loaded position.

Figure 13:
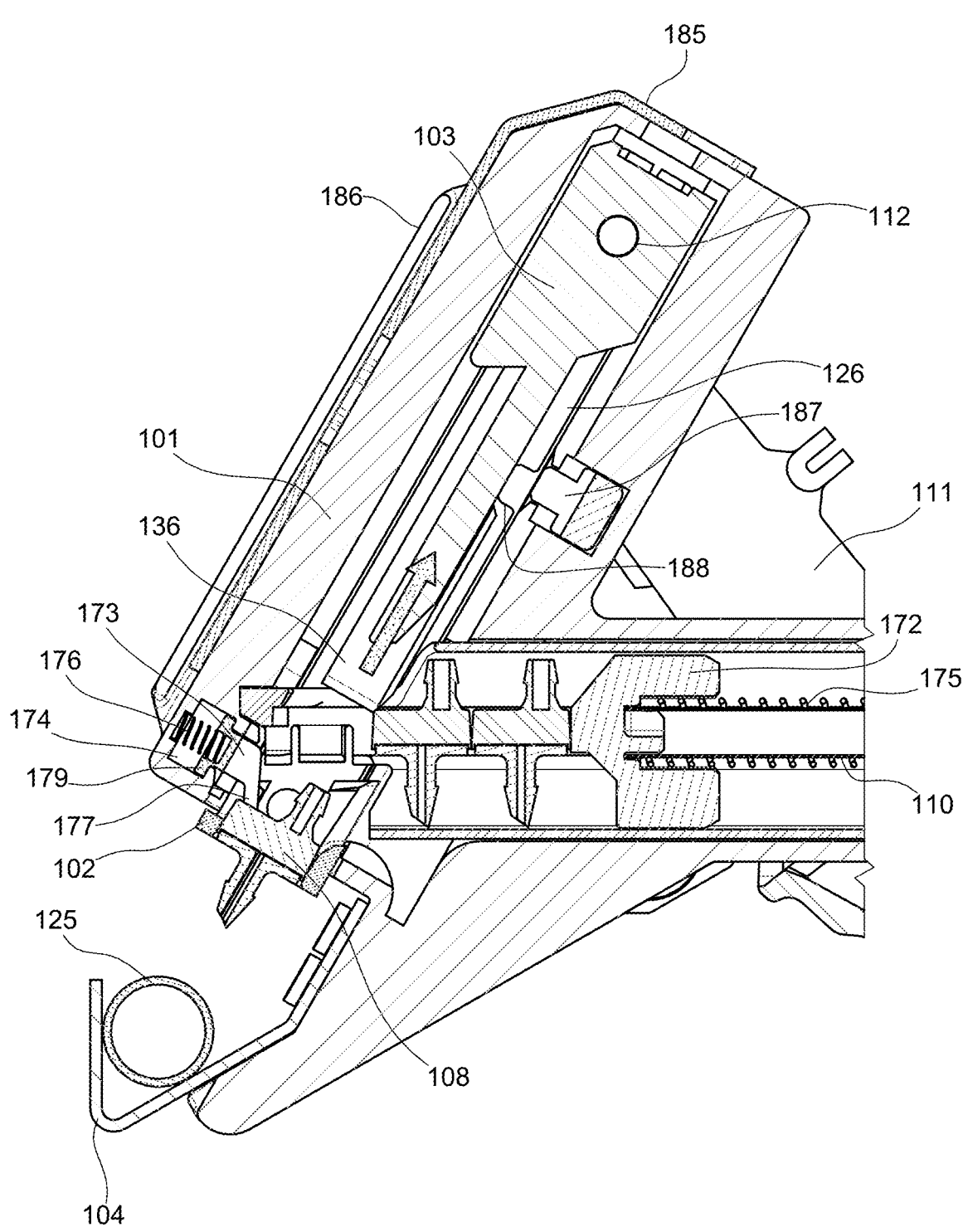
FIG. 13 shows a cross-sectional view of an embodiment of the inventive device in a second ejection state.
Figure 14:
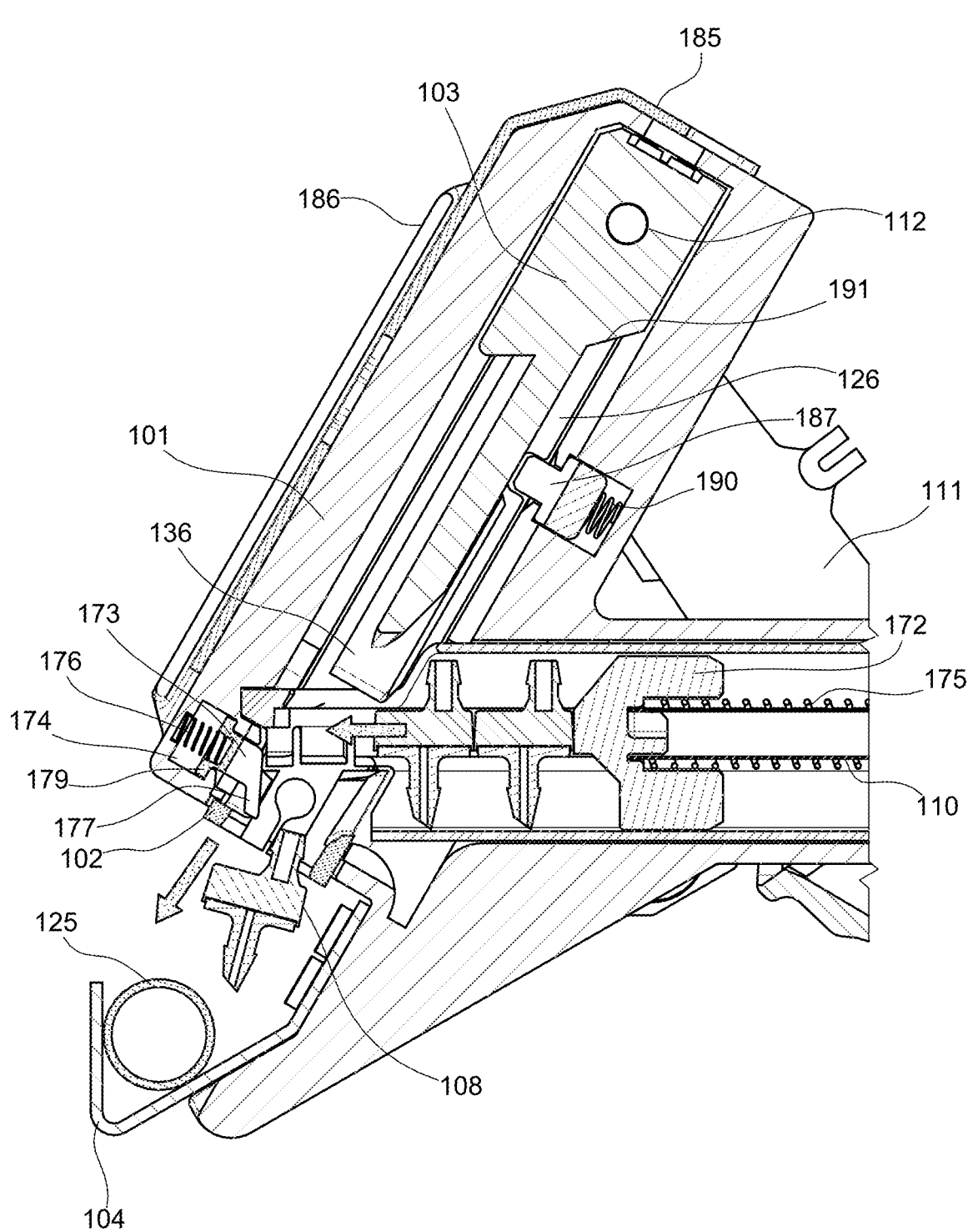
FIG. 14 shows a cross-sectional view of an embodiment of the inventive device in a third ejection state.

FIG. 13 shows the device in a second ejection state wherein plunger 102 continues its rearward travel with drip irrigation emitter 108 retained within sleeve aperture 144 causing ejector shoe 177 to contact the upper surface of the emitter. In this configuration, ejector 173 is in its extended state and ejector shoe 177 is permitted to contact the emitter through ejector port 178 which enables ejector shoe 177 to traverse the upper side of sleeve 102. FIG. 14 shows the device in a third ejection state wherein continued rearward travel of plunger 102 under the force of springs 120 overcomes the interference fit between emitter 108 and the inner surfaces of sleeve aperture 129 such that the emitter is pushed out of the forward end of sleeve aperture 129 by extended ejector 173. Simultaneously, locking blocks 187 clear the lower surface of sleeve arms 126 and are forced into sleeve notches 188 under the force of locking block springs 190 thereby forcing and maintaining sleeve 102 into a fully retracted state.

Figures 15, 16, 17:
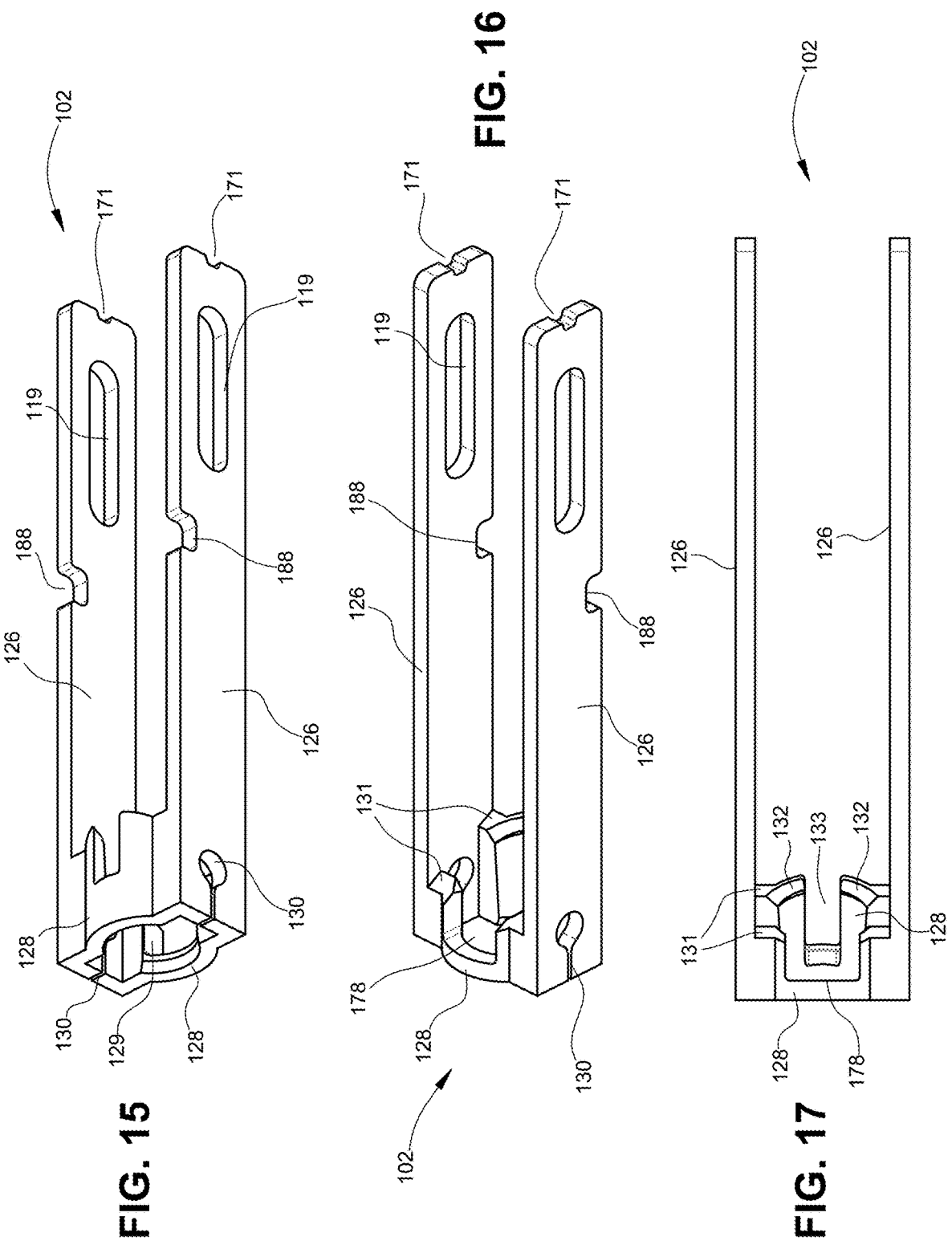
FIG. 15 shows a front, bottom perspective view of a sleeve for use with the invention.
FIG. 16 shows a rear, top perspective view of a sleeve for use with the invention.
FIG. 17 shows a plan view of a sleeve for use with the invention.

FIGS. 15 and 16 show a non-limiting embodiment of sleeve 102. In this embodiment, sleeve 102 includes a pair of opposing sleeve arms 126 which are adapted to receive plunger 103, including plunger body 134, between sleeve arms 126 in a slidable relationship. Sleeve arms 126 include sleeve slots 119 which create openings that traverse sleeve arms 126. The length of sleeve slots 119 determines the distance of the lag between the forward and rearward movement of plunger 103 relative to sleeve 102 during the activation, retraction and ejection states disclosed herein. This function is accomplished as compression of trigger 111 causes the forward movement of plunger 103 between sleeve arms 126 in a linear relationship and without lag as plunger pin 112 travels freely within sleeve slots 119 while sleeve 102 remains stationary with locking blocks 187 engaging sleeve notches 188. When plunger pin 112 contacts the forward end of sleeve slots 119, continued compression of trigger 111 causes sleeve 102 and plunger 103 to advance forward together once biased surface 191 of plunger 103 disengages locking blocks 187 from sleeve notches 188.

Sleeve arms 126 are joined to one another at the forward end of sleeve 102 by a pair of opposing end portions 128 located on the upper and lower sides of sleeve 102. End portions 128 form sleeve aperture 129 having a dimension suitable for receiving the body of a drip irrigation emitter. In some embodiments, sleeve aperture 129 has a dimension that is sufficient to create an interference fit between the inner walls of sleeve aperture 129 and the body of a drip irrigation emitter nested within sleeve aperture 129. The interference fit can be created by sleeve gaps 130 which provide spring force and permit end portions 128 to flex and separate from one another when a drip irrigation is forced into sleeve aperture 129 under the force of plunger 103. Sleeve gaps 130 can be in a "U" shape, polygonal or teardrop configuration, for example. Sleeve aperture 129 can assume an annular shape that mates with the outer circumference of the body of a drip irrigation emitter. Sleeve aperture 129 can have a draft angle wherein the opening of sleeve aperture 129 that faces the rear of sleeve 102 is greater than the diameter of a body of a drip irrigation emitter, and the opposing opening of sleeve aperture 129 that faces the front of sleeve 102 has a diameter that is less than the diameter of the body of the drip irrigation emitter when sleeve aperture is in an unflexed state. The draft angle of sleeve aperture 129 is discussed in further detail with reference to end portion surfaces 132 under FIG. 17 below. Upper end portion 128 can include ejector port 178 which is adapted to permit ejector shoe 177 to traverse upper end portion 128 when ejector 173 extends and retracts according to the activation, retraction and ejection states disclosed herein.

End portions 128 can incorporate receiving portions 131 which are adapted to contact the forward facing surfaces of body channels 146 when sleeve 102 is in its full rearward position and magazine 107 is installed within handle 106 such that magazine end 142 is positioned between sleeve arms 126. In the embodiment of sleeve 102 depicted in FIGS. 15 and 16, receiving portions 131 are angled such that they are adapted to permit upper magazine end 142 to be positioned within sleeve 102 and between sleeve arms 126 at an angle such that upper magazine end 142 is biased towards the front end of the device and cradle 104. As disclosed herein, the inventive device can be practiced with handle 106 being coupled to housing 101 at a 90-degree angle such that the longitudinal axis of handle 106 and the longitudinal axis of housing 101 are perpendicular to one another. In such embodiments, end portions 128 will have an equal length and receiving portions 131 will have surfaces that are perpendicular to the longitudinal axis of sleeve 102 and parallel to the longitudinal axis of magazine 107 when magazine 107 is installed within handle 106.

FIGS. 15 and 16 show sleeve arms 126 are separated from one another to form a void that is suitable for receiving plunger body 134 in a slidable relationship that permits plunger 103 to slide between sleeve arms 126 when the device assumes the activation, retraction and ejection states disclosed herein. Sleeve arms 126 are separated from one another by a dimension that is suitable to receive upper magazine end 142 in a slidable relationship. It will be appreciated that sleeve arms 126 can be separated from one another by the same distance at both the forward end and rear end of sleeve 102. The ends of sleeve arms 126 can include divots 171 which are adapted to collect dirt and debris so as to prevent dirt and debris from compromising the free travel of sleeve 102 within housing 101.

FIG. 17 depicts a plan view of sleeve 102. FIG. 17 shows that end portions 128 incorporate end portion surfaces 132 which face the rear end of sleeve 102. End portion surfaces 132 can form a chamfered opening so as to guide drip irrigation emitters into sleeve aperture 129. Lower end portion 128 incorporates inlet gap 133 which permits a drip irrigation emitter to be fed into magazine aperture 144 while upper magazine end 142 occupies the space between sleeve arms 126 without the emitter inlet contacting lower end portion 128 of sleeve 102.

Figures 18, 19:
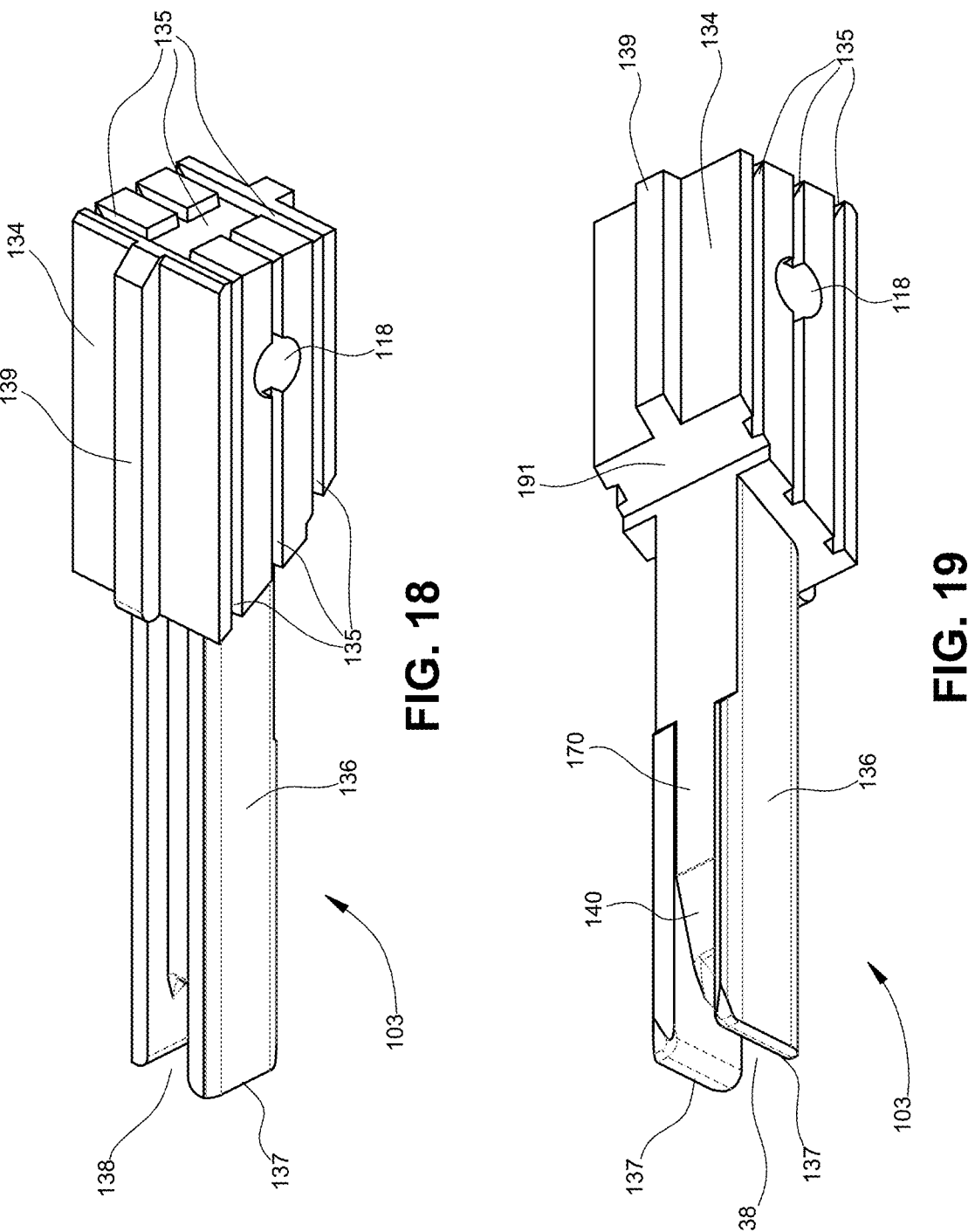
FIG. 18 shows a rear, top perspective view of a plunger for use with the invention.
FIG. 19 shows a front, bottom perspective view of a plunger for use with the invention.

FIGS. 18 and 19 show a non-limiting embodiment of plunger 103. Plunger 103 includes plunger pin opening 118 which traverses the width of plunger body 134 and is adapted to receive plunger pin 112. Plunger body 134 has a dimension that permits it to nest between sleeve arms 126 of sleeve 102 so as to permit plunger 103 to slide within sleeve 102 when the device assumes the activation, retraction and ejection states disclosed herein. Plunger body 134 can have a width that is the same as, or slightly less than, the distance between sleeve arms 126 so as to permit plunger body 134 to slide freely between sleeve arms 126. Plunger body 134 can have plunger grooves 135 which are adapted to collect dirt and debris that enters housing 101 which could otherwise compromise the free travel of plunger body 134 between sleeve arms 126. Housing 101 can include an opening on its rearward surface to permit the inside of housing to be flushed, such as with water, to remove dirt and debris from the inside of housing 101, including from plunger grooves 135 and divots 171.

Plunger 103 includes plunger ram 136 which has a dimension that is adapted to pass through magazine aperture 144 in upper magazine end 142 when the device assumes the activation, retraction and ejection states disclosed herein. Plunger ram 136 terminates in plunger ends 137. Plunger ends 137 can be have surfaces that are adapted to mate with the upper surface of the body of a drip irrigation emitter. The surfaces plunger ends 137 can be flat such that when plunger end 137 contacts the upper surface of the body of a drip irrigation emitter housed within magazine aperture 144, the drip irrigation emitter rotates to assume an orientation wherein the upper surface of the emitter is flush against plunger ends 137 when the device assumes the third activation state discussed under FIG. 7.

Plunger ram 136 includes plunger recess 138 on its forward end which is adapted to receive the spout of a drip irrigation emitter. Plunger recess 138 forms a gap between plunger ends 137 and permits the upper surface of the body of a drip irrigation emitter to abut plunger ends 137 without the spout of the emitter interfering with the contact between the upper surface of the emitter and the surfaces of plunger ends 137. Plunger 103 can include plunger ribs 139 which are adapted to interface with grooves in housing 101 so as to guide the movement of plunger 103 during the activation, retraction and ejection states disclosed herein.

The bottom surface of plunger ram 136 can include retaining surface 170 and plunger ramp 140. Retaining surface 170 is adapted to contact the side of a drip irrigation emitter that is loaded at the top of magazine 107 to prevent the emitter from advancing into magazine aperture 144 of upper magazine end 142 while plunger ram 136 is traveling through magazine aperture 144 during the activation, retraction and ejection states disclosed herein. Plunger ramp 140 is biased so as to permit a drip irrigation emitter to slide into magazine aperture 144 in upper magazine end 142 when retaining surface 170 clears the drip irrigation emitter during the third retraction state discussed under FIG. 11. The bias of plunger ramp 140 also provides an angled surface that pushes the top drip irrigation emitter within magazine 107 downward and into magazine 107 during the forward travel of plunger 103 so as to prevent the top emitter from interfering with the travel of plunger 103 during the activation states disclosed herein.

Figure 20:
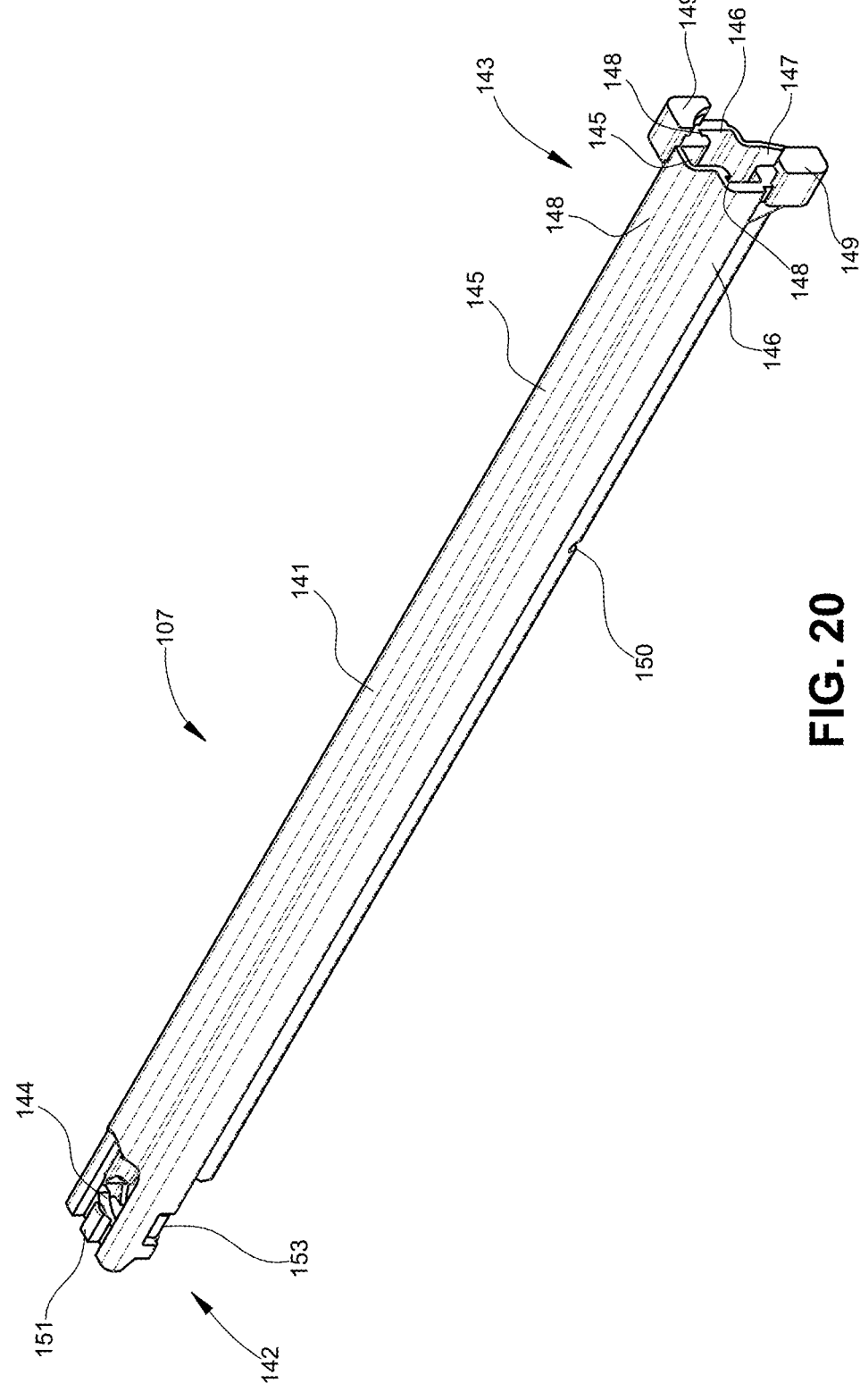
FIG. 20 shows a rear perspective view of a magazine for use with the invention.

FIG. 20 shows a top perspective view of a non-limiting embodiment for magazine 107 which comprises magazine body 141 terminating in upper magazine end 142 and lower magazine end 143. Magazine body 141 is adapted to be installed within handle 106 wherein upper magazine end 142 is fed into the bottom of handle 106. Magazine body 141 comprises notch 150 which interfaces with magazine latch 109 at the bottom of handle 106 so as to retain magazine 107 within handle 106. Upper magazine end 142 comprises magazine aperture 144 which is adapted to retain a drip irrigation emitter in an orientation suitable for feeding the emitter into sleeve aperture 129 under the force of plunger 103. Magazine aperture 144 has a dimension sufficient to permit plunger ram 136 to traverse magazine aperture 144 during the activation, retraction and ejection states disclosed herein.

Magazine body 141 includes spout channel 145, body channel 146, and inlet channel 147. Spout channel 145 is adapted to receive the spout of a drip irrigation emitter, while body channel 146 is adapted to receive the body of the emitter and inlet channel 147 is adapted to receive the inlet of the emitter. Together, spout channel 145, body channel 146 and inlet channel 147 create lumen through magazine body 141 that is adapted to house a plurality of drip irrigation emitters in a linear series. Spout channel 145 faces the rear of the device when magazine 107 is received within handle 106.

Magazine 107 includes alignment tracks 148 which form grooves along the upper surface of body channels 146. Alignment tracks 148 are adapted to mate with follower guides 195 on lateral follower arms 196 of magazine follower 172 so as to guide the travel of magazine follower 172 through magazine body 141.

Magazine 107 includes magazine closure 149 which is adapted to interface with magazine rod base 127 in a locking relationship so as to retain magazine rod 110 within magazine body 141. Magazine closure 149 can comprise features that are adapted to interface with complimentary features on magazine rode base 127. In some embodiments, magazine closure 149 includes one or more slots 194 which mate with one or more base tabs 193 on magazine base 127 when magazine rod base 127 is rotated to engage base tabs 193 within slots 194 to provide a locking relationship.

Figure 21:
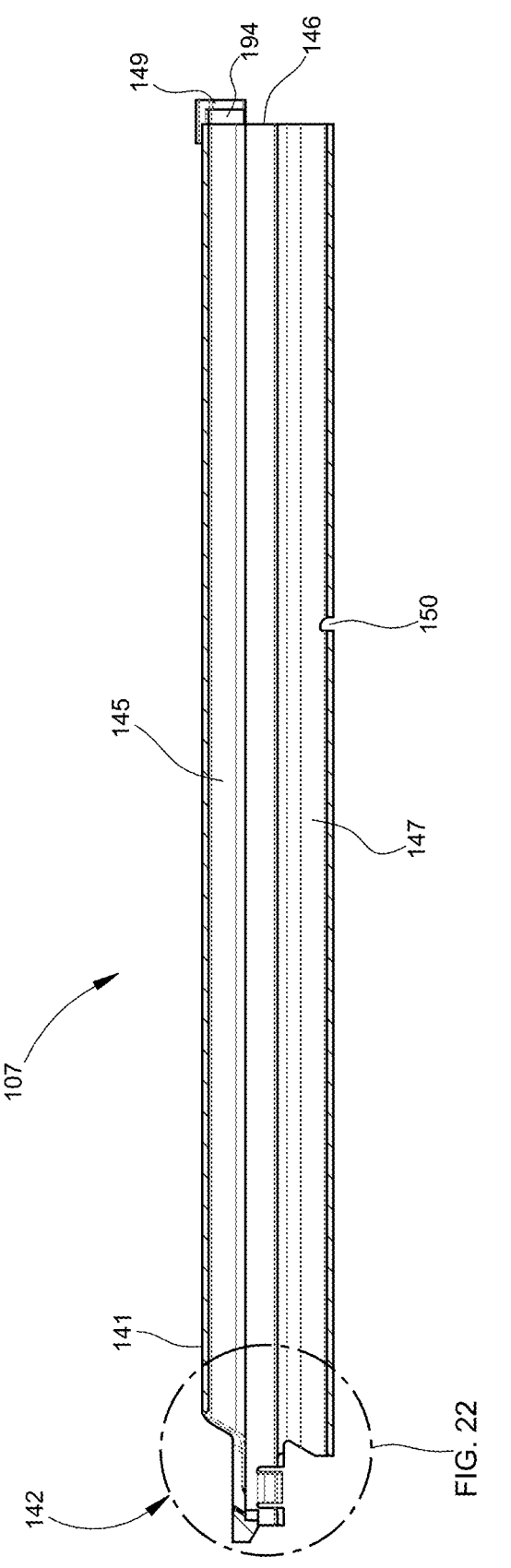
FIG. 21 shows a longitudinal cross-sectional view of a magazine for use with the invention.

FIG. 21 shows a longitudinal cross-sectional view of magazine 107. As shown, magazine rod 110 and magazine follower 172 are removed and spout channel 145 is shown above body channel 146 and inlet channel 147. Body channel 146 extends beyond spout channel 145 and inlet channel 147 to form the terminus of upper magazine end 142. Thus, when a drip irrigation emitter is housed within magazine aperture 144, the body of the emitter remains enshrouded by body channel 146, while the spout and inlet of the emitter are exposed. Magazine body 141 includes latch notch 150 which is adapted to interface with magazine latch 109 to retain magazine 107 within handle 106.

Figure 22:
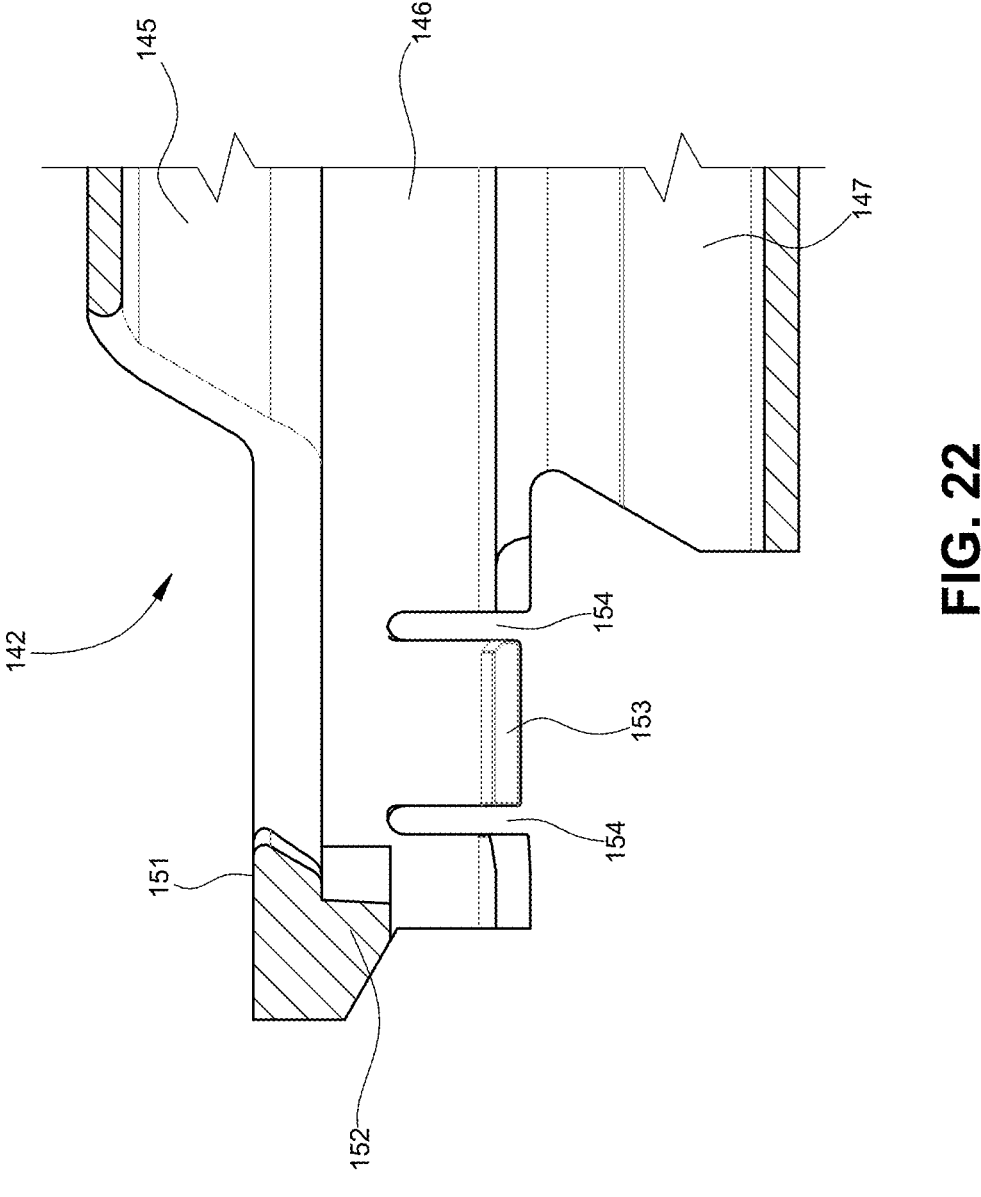
FIG. 22 shows the upper end of the magazine from FIG. 21.

FIG. 22 shows upper magazine end 142 from FIG. 21, wherein upper magazine end 142 comprises magazine shroud 151. Magazine shroud 151 is adapted to contact the top, peripheral surface of the body of a drip irrigation emitter housed within magazine aperture 144. Magazine shroud 151 features shroud rib 152 which abuts the side of the body of a drip irrigation emitter housed within magazine aperture 144, while the opposing side of the body of the emitter is in contact with magazine follower 172 under the force of magazine rod 110. Upper magazine end 142 further includes a pair of opposing channel tabs 153 which form a portion of the opposing walls of body channel 146. Channel tabs 153 have a space between them that is smaller than the diameter of the body of a drip irrigation emitter such that tabs contact the sides of the body of the emitter and hold the emitter under tension within magazine aperture 144. Thus, channel tabs 153 form inward indentations within body channel 146. Channel slots 154 permit channel tabs 153 to flex away from the internal space within body channel 146 when a drip irrigation emitter is chambered in magazine aperture 144 such that channel tabs 153 cooperate with magazine shroud 151 and magazine rib 152 to maintain the emitter in a stable orientation in magazine aperture 144 for contact with plunger ends 137 during the activation states disclosed herein. Channel slots 154 permit channel tabs 153 to flex away from the internal space within body channel 146 when a drip irrigation emitter is forced into sleeve aperture 129 from magazine aperture 144 by plunger 103.

It will be appreciated that the device can be practiced with a magazine wherein drip irrigation emitters are loaded in the upper end of the magazine. In such an embodiment, the magazine rod 110 can be fixed within the magazine and the magazine would omit magazine closure 149. The top-loading magazine would include the other features disclosed in magazine 107, such as spout channel 145, body channel 146, and latch notch 150.

Figure 23:
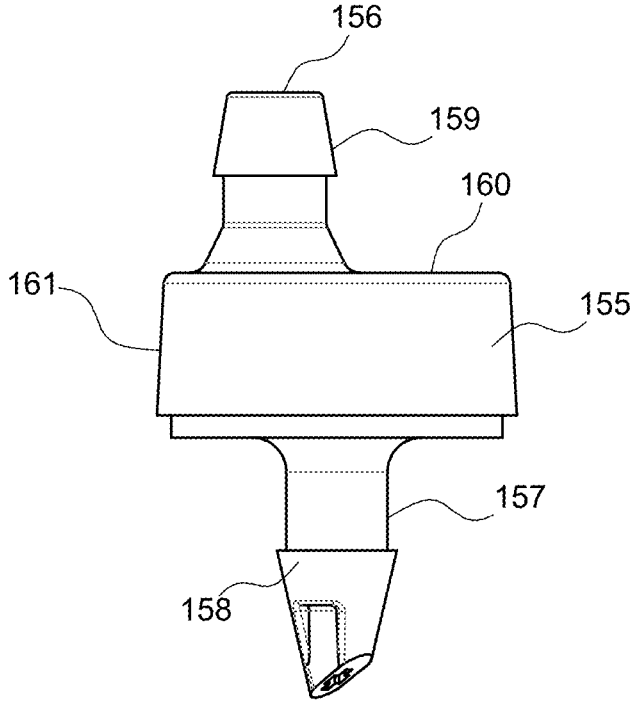
FIGS. 23 and 24 show non-limiting embodiments of drip irrigation emitters for use with the invention.

Magazine 107 can be used with centered and offset drip irrigation emitters. FIG. 1 shows magazine 107 housing a plurality of offset drip irrigation emitters 108 in series. FIG. 23 shows a non-limiting embodiment of an offset drip irrigation emitter for use with the invention. The offset drip irrigation emitter comprises drip irrigation emitter body 155, spout 156 and inlet 157. Inlet 157 preferably has a point that is adapted to pierce the wall of drip irrigation tubing under the force of plunger 103 as disclosed herein. The point can be biased such that the point is angled on one side. Inlet 157 includes inlet barb 158 which is adapted to retain inlet 157 within drip irrigation tubing. Spout 156 can include spout barb 159 which is adapted to retain spout 156 within drip irrigation distribution tubing. Spout 156 protrudes from upper emitter surface 160 such that spout 156 is offset from the center of upper emitter surface 160. Offset drip irrigation emitters suitable for use with the invention include, but are not necessarily limited to, the following Rainbird™ irrigation emitters: SW05, 0.5 GPH Spot Watering Emitters (SKU A50803); SW10, 1.0 GPH Spot Watering Emitters (SKU A50804); and SW20, 2.0 GPH Spot Watering Emitters (SKU A50805).

Figure 24:
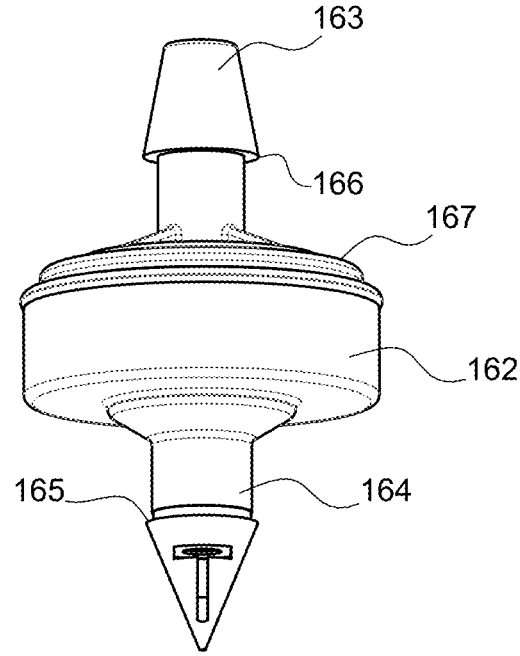

FIG. 24 shows a non-limiting embodiment of a drip irrigation emitter having a centered spout for use with the invention. The drip irrigation emitter comprises emitter body 162, spout 163 and inlet 164. Inlet 164 preferably has a point that is adapted to pierce the wall of drip irrigation tubing under the force of plunger 103 as disclosed herein. The point can be biased such that the point is angled on one side. Inlet 164 includes inlet barb 165 to permit the drip irrigation emitter to be retained within drip irrigation tubing. Spout 163 can include spout barb 166 which is adapted to retain spout 163 within the end of a section of drip irrigation distribution tubing. Spout 163 protrudes from upper emitter surface 167 such that spout 163 is centered on upper emitter surface 167. Centered drip irrigation emitters suitable for use with the invention include, but are not necessarily limited to, the following Rainbird™ irrigation emitters: PC05, Pressure-Compensating Module, Barb Inlet, 5.0 GPH (SKU x71005), PC07, Pressure-Compensating Module, Barb Inlet, 7.0 GPH (SKU x71007), PC10, Pressure-Compensating Module, Barb Inlet, 10.0 GPH (x71010), PC12, Pressure-Compensating Module, Barb Inlet, 12.0 GPH (SKU x71012), PC18, Pressure-Compensating Module, Barb Inlet, 18.0 GPH (SKU X71018), PC24, Pressure-Compensating Module, Barb Inlet, 24.0 GPH (SKU x71024). Other manufacturers of centered drip irrigation emitters for use with the device include, but are not necessarily limited to, Netafim (Israel), Jain (China), Hunter Industries (U.S.), NDS (U.S.), Toro (U.S), DIG Corp. (U.S.), IRRITEC SpA (Italy), OASE (Germany), Rough Bros. (U.S.), DRIPWORKS, Inc. (U.S.), and Morrill Industries (U.S.).

Figures 25, 26, 27, 28:
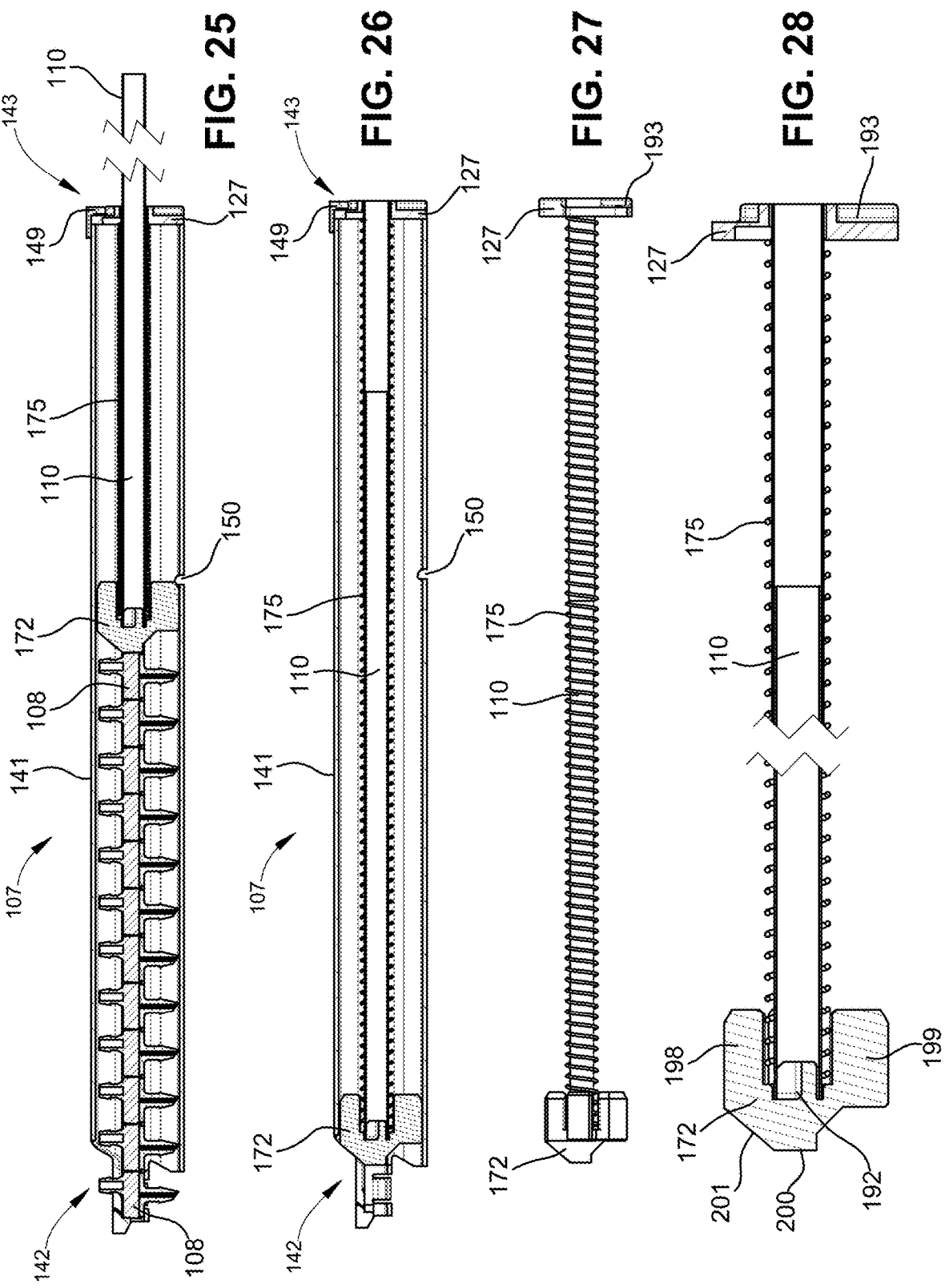
FIG. 25 shows a longitudinal cross-sectional view of an embodiment of a magazine for use with the inventive device having drip irrigation emitters and a magazine rod loaded therein.
FIG. 26 shows a longitudinal cross-sectional view of the magazine of FIG. 25 without drip irrigation emitters loaded therein.
FIG. 27 shows an isolated view of the magazine rod of the magazine of FIG. 25.
FIG. 28 shows a longitudinal cross-sectional view of the magazine rod of FIG. 25.

FIG. 25 is a longitudinal cross-sectional view of magazine 107 having a plurality of offset drip irrigation emitters loaded therein. FIG. 25 shows the cooperation of magazine 107, magazine rod 110, magazine spring 175, magazine follower 172, magazine rod base 127 and magazine closure 149 with the magazine in a loaded state. The lowermost of drip irrigation emitters 108 is in contact with follower push face 200, with the plurality of the emitters being forced to upper end 142 of magazine 107 under the force of magazine spring 175. In this loaded state, magazine base 127 is secured to magazine closure 149 and the lower end of magazine rod protrudes from lower magazine end 143 through an aperture in magazine rod base 127. As emitters are fed through magazine 107 through the activation states disclosed herein, magazine rod 110 slides through the aperture in magazine rod base 127 as magazine follower 172 advances towards upper magazine end 142. Magazine rod 110 similarly slides through the aperture in magazine rod base 127 when magazine 107 is loaded with drip irrigation emitters and magazine rod 110 and follower 172 are placed within magazine body 141 and spring 175 is compressed to permit the engagement of magazine closure 149 with magazine rod base 127.

FIG. 26 shows a longitudinal cross-sectional view of magazine 107 in an unloaded state. In this state, magazine rod 110 is fully extended and magazine follower 172 is at its terminal position at upper magazine end 142. Magazine follower 172 can be maintained in its terminal position by follower guides 195 abutting follower stop 197 at the terminal, upper end of alignment tracks 148. The lower end of magazine rod 110 is shown flush with the outside surface of magazine rod base 127. However, it will be appreciated that magazine rod 110 can have a length wherein a portion of the rod extends beyond the outside surface of magazine rod base 127 when magazine rod 110 occupies magazine 107 in an unloaded state.

FIG. 27 shows magazine rod 110 enshrouded by magazine spring 175, magazine rod base 127 connected to magazine spring 175, and magazine follower 172 connected to the upper end of magazine rod 110. Magazine spring 175 can be fixed to magazine rod base 127 by a mechanical connection, adhesive, or a combination thereof. For example, the end of magazine spring 175 can be bent at a substantially 90 degree angle and nested within an aperture on magazine rod base 127.

FIG. 28 shows a longitudinal cross-sectional view of magazine rod 110 with the upper end of magazine rod 110 fixed to magazine follower 172 by follower interlock 192. Follower interlock 192 forms a protrusion within a depression on the rearward facing surface of magazine follower 172. Follower interlock 192 nests within the terminal end of magazine rod 110, it being understood that at least the terminal end of magazine rod 110 is hollow so as to permit follower interlock 192 to fit within the terminal end. It will likewise be understood that the entire length of magazine rod 110 can be a tube. Follower interlock 192 can be secured to magazine rod 110 by an interference fit, adhesive, rivets, screws, mating protrusions and depressions, or a combination thereof. In some embodiments, magazine spring 175 is fixed to the upper end of magazine rod 110. As shown in FIG. 28, the upper terminal end of magazine rod 110 and the upper terminal end of magazine spring 175 can occupy the depression in magazine follower 172. The lower end of magazine rod 110 terminates in magazine rod base 127 having one or more base tabs 193 which are adapted to mate with one or more slots 194 in magazine closure 149 when magazine rod base 127 is rotated to lock magazine rod 110 within magazine body 141.

In some embodiments, magazine rod 110 is telescoping and formed from two sections of rod wherein a smaller diameter rod is slidably nested within a larger diameter rod with the smaller diameter rod forming the forward end of magazine rod 110. In the telescoping embodiment, the lower, larger diameter rod and magazine spring 175 are fixed to magazine rod base 127, and the upper, smaller diameter rod and magazine spring 175 are fixed to magazine follower 172 as disclosed herein. When magazine rod 110 is compressed in the telescoping embodiment, the lower end of the smaller diameter rod slides through the larger diameter rod and exits the aperture in magazine rod base 127. The smaller diameter rod can have a length such that the lower end of the smaller diameter rod is flush with magazine rod base 127 when magazine 107 is empty and not loaded with drip irrigation emitters. The telescoping magazine rod embodiment reduces the amount of the rod that is located outside of magazine 107 when the magazine is loaded with drip irrigation emitters.

Figures 29, 30, 31:
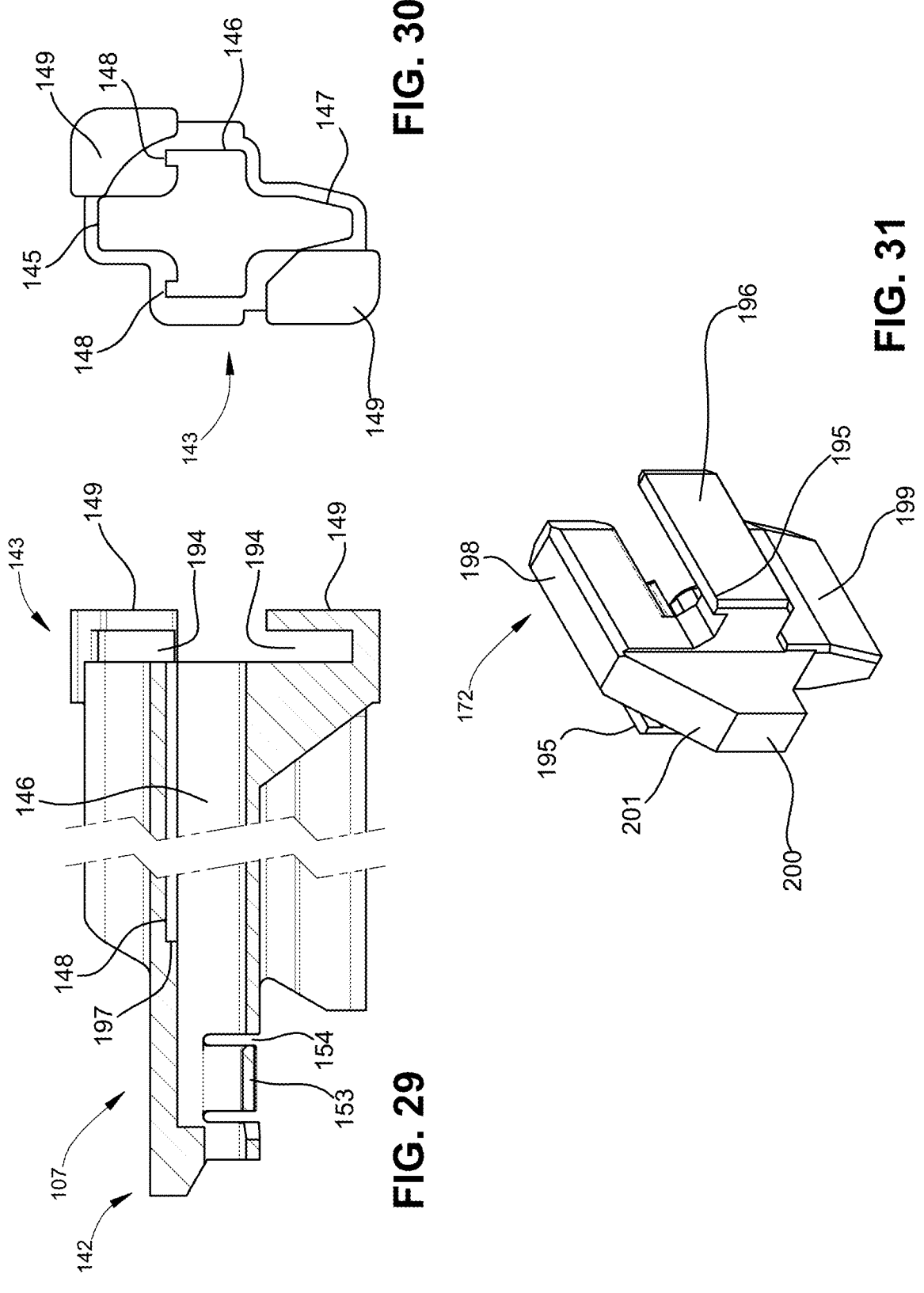
FIG. 29 shows a longitudinal cross-sectional view of the upper and lower ends of the magazine of FIG. 25 without emitters or a magazine rod loaded therein.
FIG. 30 shows an end view of the bottom of the magazine of FIG. 25 without emitters or a magazine rod loaded therein.
FIG. 31 shows a perspective view of the magazine follower of the magazine of FIG. 26.

FIG. 29 shows a longitudinal cross-sectional view of upper magazine end 142 and lower magazine end 143, wherein the view is bisected along body channel 146. Upper magazine end 142 is shown with channel tab 153 and channel slots 154 forming the side of body channel 146. Alignment track 148 forms a groove along the length of the upper surface of body channel 146. Alignment tracks 148 are adapted to mate with follower guides 195 on lateral follower arms 196, and to guide the travel of magazine follower 172 through magazine 107. Alignment tracks 148 terminate in follower stops 197 on upper magazine end 142. Follower stops 197 form abutments that close alignment tracks 148 on upper magazine end 142 and are adapted to prevent the further travel of magazine follower 172 towards upper magazine end 142 when the last emitter in magazine 107 is fed into magazine aperture 144. Follower stops 197 prevent the further travel of magazine follower 172 when follower guides 195 contact follower stops 197, preventing the magazine follower 172 from impeding the movement of plunger 103 if the device is actuated without any emitters loaded in magazine 107. Lower magazine end 143 is shown featuring magazine closure 149 and slots 194.

FIG. 31 shows an isolated view of magazine follower 172. Magazine follower includes a pair of opposing lateral follower arms 196. The upper end of magazine follower 172 features upper follower guide 198 and lower follower guide 199. The forward-facing end of magazine follower 172 terminates in follower push face 200 and plunger clearance face 201. Follower push face 200 contacts the lower-most drip irrigation emitter when magazine follower 172 is installed in a magazine 107 that is loaded with emitters. Plunger clearance face 201 forms a biased surface that prevents follower 172 from contacting plunger 103 during the activation, retraction and ejection states disclosed herein. In particular, plunger clearance face 201 avoids contact with plunger ram 136 during the forward and rearward travel of plunger 103 when magazine 107 is free of drip irrigation emitters and magazine follower 172 is adjacent to sleeve 102 and plunger ram 136 at upper magazine end 142.

FIG. 30 is a plan view of an embodiment of lower magazine end 143 showing spout channel 145, body channel 146, inlet channel 147, alignment tracks 148 and magazine closure 149. Spout channel 145, body channel 146, inlet channel 147 and alignment tracks 148 form a lumen that matches the cross-sectional profile of magazine follower 172. In particular, spout channel 145 is adapted to receive upper follower guide 198, inlet channel 147 is adapted to receive lower follower guide 199, body channel 146 is adapted to receive lateral follower arms 196, and alignment tracks 148 are adapted to receive follower guides 195. It will be appreciated that the tolerances of the mating of the cross-sectional profile of magazine follower 172 and the opening in magazine 107 formed by spout channel 145, body channel 146, inlet channel 147 and alignment tracks 148 will be sufficient to permit the free travel of magazine follower 172 through magazine 107. FIG. 30 further shows magazine closure 149. As will be appreciated by the disclosure herein, magazine closure 149 includes slots 194 beneath the planar portions of magazine closure 149 shown in FIG. 30. As disclosed herein, one or more slots 194 are adapted to receive one or more base tabs 193 when magazine rod base 127 is rotated to engage base tabs 193 within slots 194 thereby securing magazine rod base 127 to magazine body 141.

The invention provides a method of repeatedly installing drip irrigation emitters in drip irrigation tubing. Without limiting any disclosure herein, the method can be practiced by a user opening magazine closure 149 by rotating magazine rod base 127 to disengage base tabs 193 from slots 194. Magazine rod 110, along with magazine spring 175 and follower 172, are then withdrawn from magazine 107 to expose the opening produced by spout channel 145, body channel 146, inlet channel 147 and alignment tracks 148. Drip irrigation emitters are then repeatedly inserted into the opening so that the magazine is filled with a plurality of emitters. Magazine 110 rod with magazine follower 172 attached thereto is then inserted into lower magazine end 143 such that follower push face 200 of magazine follower 172 contacts the last-loaded emitter and magazine spring 175 is compressed such that magazine rod 110 slides through, and protrudes from, the opening in the bottom of magazine base 127.

With telescoping magazine rod 110 installed within magazine 107, follower push face 200 contacts the side of the body of the drip irrigation emitter nearest lower magazine end 143 thereby forcing the plurality of emitters within magazine 107 towards upper magazine end 142. Magazine rod base 127 is then rotated causing base tabs 193 to enter slots 194 on magazine rod base 127 thereby securing magazine rod 110 within magazine 107. In magazine 107's loaded state, the drip irrigation emitter nearest upper magazine end 142 is housed within magazine aperture 144 and held in a stable configuration as the top, peripheral surface of the body the emitter is in contact with magazine shroud 151, the upper side of the emitter body is in contact with shroud rib 152, and the opposing sides of the emitter body are in contact with channel tabs 153. Loaded magazine 107 is then installed in handle 106 to permit magazine latch 109 to engage latch notch 150 thereby retaining magazine 107 within handle 106. In this loaded state, upper magazine end 142 occupies the space between sleeve arms 126 near the forward end of sleeve 102.

With the loaded magazine 107 installed within handle 106, the device assumes the resting state described herein under FIG. 4. The device is then ready to repeatedly install drip irrigation emitters into drip irrigation tubing. A first drip irrigation emitter is installed by placing a section of drip irrigation tubing within cradle 104. Trigger 111 is then compressed towards handle 106 so that the force of the movement of trigger 111 is transferred to plunger pin 112 through rotating cooperation of trigger ears 113 and linking bodies 116 such that the device assumes the activation states disclosed herein. Briefly, compression of trigger 111 causes plunger 103 to begin its forward advance between sleeve arms 126 towards drip irrigation tubing placed within cradle 104. Sleeve 102 remains in its rearward position as locking blocks 187 are positioned in sleeve notches 188 and prevent the forward advance of sleeve 102.

The continued forward advancement of plunger 103 by means of compression of trigger 111 causes the surface of plunger ends 137 to contact the upper surface of the drip irrigation emitter chambered in magazine aperture 144. Continued pressure on trigger 111 continues the advancement of plunger 103 causing the drip irrigation emitter chambered in magazine aperture 144 to rotate such that the upper surface of the emitter becomes flush with the surfaces of plunger ends 137 while the spout of the emitter is received within plunger recess 138. Continued advancement of plunger 103 causes plunger ram 136 to travel through magazine aperture 144 forcing the drip irrigation emitter into sleeve aperture 129 under an interference fit. Continued compression of trigger 111 causes the further advance of plunger 103 whereupon plunger pin 112 contacts the forward end of sleeve slots 119 leading sleeve 102 to advance with plunger 103 towards cradle 104 with a drip irrigation emitter retained within sleeve aperture 129. Simultaneously, biased surface 191 of plunger 103 contacts and forces locking blocks 187 into locking block mounts 189 thereby disengaging locking blocks 187 from sleeve notches 188 to permit the forward advance of sleeve 102 together with plunger 103. Continued advancement of plunger 103 with the drip irrigation emitter retained within sleeve aperture 129 causes the barbed inlet of the drip irrigation emitter to pierce the wall of the section of drip irrigation tubing in cradle 104 thereby installing the drip irrigation emitter in the tubing.

Once the emitter is installed in the drip irrigation tubing, the user's grip is relaxed on trigger 111 causing the device to assume the retraction states disclosed herein. Briefly, the relaxation of the user's grip on trigger 111 causes plunger 103 to retract within sleeve 102 away from the drip irrigation emitter which remains installed in the section of drip irrigation tubing under the friction of the barb on the emitter inlet. Plunger 103 retracts away from the section of drip irrigation tubing in cradle 104 under the force of springs 120. Sleeve 102 remains in its forward position with the emitter remaining within sleeve aperture 129 due to the interference fit between the emitter and the inside surfaces of sleeve aperture 129. As plunger 103 retracts within sleeve 102, plunger pin 112 travels freely through sleeve slots 119 until plunger pin 112 contacts the rear end of sleeve slots 119 thereby causing sleeve 102 to retract away from the installed drip irrigation emitter together with plunger 103 as the force of springs 120 overcomes the interference fit between the inside surfaces of sleeve aperture 129 and the emitter. Plunger 103 and sleeve 102 retract together into housing 101 whereupon plunger ram 136 clears the second emitter in magazine 107 permitting the second emitter to advance into magazine aperture 144 with the inlet of the second emitter passing through inlet gap 133 on sleeve 102. Simultaneously, locking blocks 187 are forced into locking block mounts 189 on sleeve arms 126 under the force of locking block springs 190 assisting the rearward movement of sleeve 102 and locking sleeve 102 in its rearward position.

With the second drip irrigation emitter housed within magazine aperture 144, the device assumes the resting state disclosed herein such that the device is ready to install the second drip irrigation emitter into another section of drip irrigation tubing. The activation and retraction states disclosed herein can then be repeated to install a plurality of drip irrigation emitters.

Figure 32:
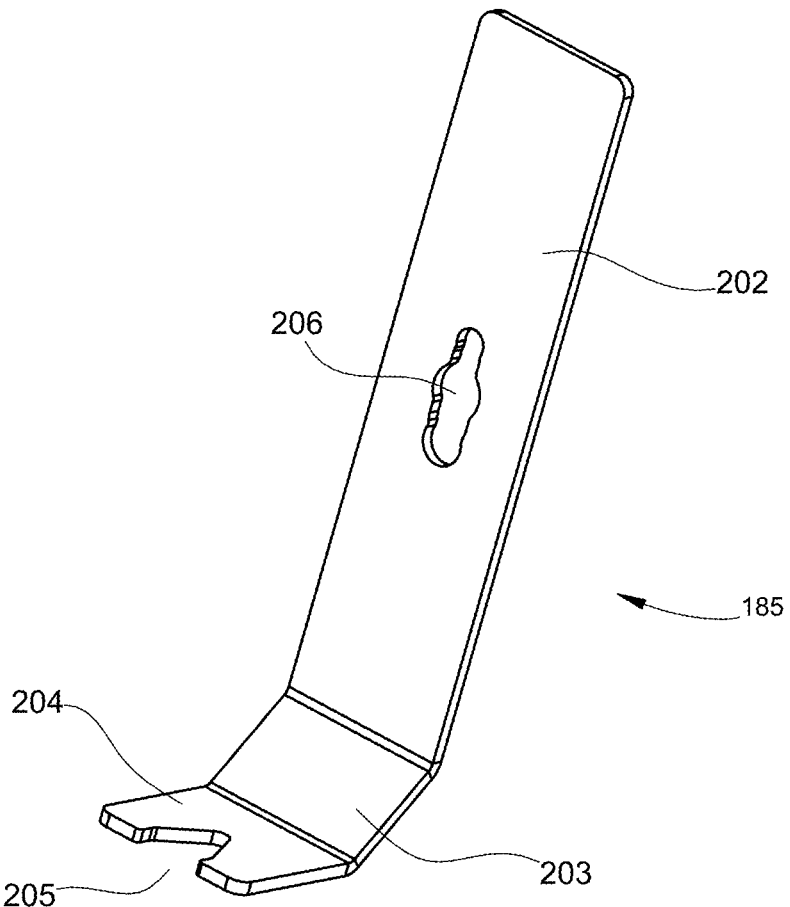
FIG. 32 shows an embodiment of the inventive drip irrigation fitting removal tool.

FIG. 32 shows a top perspective view of a non-limiting embodiment of drip irrigation fitting removal tool 185. Drip irrigation fitting removal tool 185 is adapted to remove drip irrigation fittings including, but not limited to, drip emitters, goof plugs, tees, elbows, couplers, misters, and foggers. Drip irrigation fitting removal tool 185 comprises arm portion 102, fulcrum portion 203 and claw portion 204. Claw portion 204 comprises notch 205 which is adapted to receive the neck portion of a drip irrigation fitting. As used herein, the phrase "neck portion" refers to the portion of a drip irrigation fitting that is located above the fitting's barb. For instance, the portion between drip irrigation body 155 and inlet barb 165 in FIG. 23 provides a non-limiting example of a "neck portion" of a drip irrigation fitting. Notch 205 can be adapted to receive the neck portions of ¼ inch drip irrigation fittings. Arm portion 202 comprises arm opening 206 which is adapted to receive the surface of a drip irrigation fitting opposite the barbed portion of the fitting. For example, opening 206 can be adapted to receive the head of a goof plug opposite the barbed portion of the goof plug, or the spout of a drip irrigation emitter.

Arm opening 206 provides a means for using drip irrigation fitting removal tool 185 to install drip irrigation fittings which are small and difficult to manipulate by hand. For example, goof plugs are small and difficult to grasp with sufficient force to press the goof plugs into drip irrigation tubing by hand. Moreover, pressing drip irrigation fittings into drip irrigation tubing requires significant force which can produce pain in the fingers and thumb, particularly when the installation of a large number of fittings is required. Arm opening 206 can have varying widths to accommodate drip irrigation fittings of various sizes. Arm portion 202, fulcrum portion 203, and claw portion 204 are preferably, but not necessarily, planar and formed from a metal or metal alloy. While fulcrum portion 204 is shown as being flat, it will be appreciated that fulcrum portion 204 can be a "C" shape, "V" shape or "U" shape.

Drip irrigation fitting removal tool 185 can be used in a method for removing drip irrigation fittings by providing a drip irrigation fitting that is installed in drip irrigation tubing, grasping the tool by arm portion 202, placing notch 205 around the neck portion of the installed drip irrigation fitting, and prying arm portion 206 downwards towards the drip irrigation tubing until the barb of the fitting is withdrawn from the tubing. Preferably, the longitudinal axis of the tool is in-line with the longitudinal axis of the drip irrigation tubing when arm portion 202 is pried downwards.

While specific embodiments of the inventive devices and methods have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein, but is intended to cover modifications within the spirit and scope thereof as defined by the appended claims and any and all equivalents thereof.

REFERENCE CHARACTERS

101-Housing
102-Sleeve
103-Plunger
104-Cradle
105-Cradle Sides
106-Handle
107-Magazine
108-Drip Irrigation Emitter
109-Magazine Latch
110-Magazine Rod
111-Trigger
112-Plunger Pin
113-Trigger Ears
114-Trigger Screws
115-Trigger Screw Threads
116-Linking Bodies
117-Housing Slots
118-Plunger Pin Opening
119-Sleeve Slots
120-Springs
121-Spring Housings
122-Spring Ends
123-Receiving Portions
124-Spring Ends
125-Section of Drip Irrigation Tubing
126-Sleeve Arms
127-Magazine Rod Base
128-End Portions
129-Sleeve Aperture
130-Sleeve Gaps
131-Receiving Portions
132-End Portion Surfaces
133-Inlet Gap
134-Plunger Body
135-Plunger Grooves
136-Plunger Ram
137-Plunger Ends
138-Plunger Recess
139-Plunger Rib
140-Plunger Ramp
141-Magazine Body
142-Upper Magazine End
143-Lower Magazine End
144-Magazine Aperture
145-Spout Channel
146-Body Channel
147-Inlet Channel
148-Alignment Tracks
149-Magazine Closure
150-Latch Notch
151-Magazine Shroud
152-Shroud Rib
153-Channel Tabs
154-Channel Slots
155-Drip Irrigation Emitter Body
156-Spout
157-Inlet
158-Inlet Barb
159-Spout Barb
160-Upper Emitter Surface
161-Emitter Body Side
162-Emitter Body 163-Spout
164-Inlet
165-Inlet Barb
166-Spout Barb
167-Upper Emitter Surface
168-Clip
169-Spring Retainer
170-Retaining Surface
171-Divots
172-Magazine Follower
173-Ejector
174-Ejector Mount
175-Magazine Spring
176-Ejector Spring
177-Ejector Shoe
178-Ejector Port
179-Ejector Shoulders
180-Spring Mounts
181-Receiving Grooves
182-Threaded Opening
183-Ear Receiving Grooves
184-Spring Housing Openings
185-Drip Irrigation Removal Tool
186-Tool Mounts
187-Locking Blocks
188-Sleeve Notches
189-Locking Block Mounts
190-Locking Block Springs
191-Biased Surface
192-Follower Interlock
193-Base Tabs
194-Slots
195-Follower Guides
196-Lateral Follower Arms
197-Follower Stop
198-Upper Follower Guide
199-Lower Follower Guide
200-Follower Push Face
201-Plunger Clearance Face
202-Arm Portion
203-Fulcrum Portion
204-Claw Portion
205-Notch
206-Arm Opening
207-Trigger Ear Openings

The invention claimed is:

1. A device for repeatedly installing drip irrigation emitters, the device comprising:
a) a housing;
b) a magazine;
c) a sleeve slidably disposed in said housing, wherein said sleeve (i) is adapted to receive a drip irrigation emitter from said magazine, and (ii) comprises at least one notch in a lower surface of said sleeve;
d) a plunger slidably disposed in said sleeve;
e) at least one locking block that is adapted to mate with said at least one notch; and
f) a cradle that is adapted to receive a section of a drip irrigation tubing;
wherein said at least one locking block, once mated with said at least one notch, releasably locks said sleeve in a retracted position within said device.

2. The device of claim 1, wherein said magazine is adapted to contain a plurality of drip irrigation emitters, each of said drip irrigation emitters having a spout and an inlet.

3. The device of claim 2, wherein said magazine comprises a channel that is adapted to receive said spouts.

4. The device of claim 3, wherein said channel is adapted to receive spouts that are offset from a center of each of said drip irrigation emitters.

5. The device of claim 1, wherein said device further comprises a handle that is adapted to receive said magazine.

6. The device of claim 5, wherein said device has a rear end and a bottom of said handle is slanted towards said rear end.

7. The device of claim 1, wherein said plunger is adapted to drive said sleeve towards said cradle.

8. The device of claim 1, wherein said plunger is adapted to drive said drip irrigation emitter into said section of drip irrigation tubing when said section of drip irrigation tubing is nested within said cradle.

9. The device of claim 1, wherein said sleeve includes an aperture that is dimensioned to retain said drip irrigation emitter when said drip irrigation emitter is received in said sleeve.

10. The device of claim 1, wherein said sleeve is adapted to receive said drip irrigation emitter from said magazine at an acute angle.

11. The device of claim 1, wherein said plunger is adapted to rotate said drip irrigation emitter to render a bisecting axis of said drip irrigation emitter perpendicular to a longitudinal axis of said sleeve when said plunger drives said drip irrigation emitter towards said cradle.

12. The device of claim 1, wherein said device further comprises an ejector that is adapted to eject said drip irrigation emitter when said sleeve retracts into said device with said drip irrigation emitter received within said sleeve.

13. A method of installing a drip irrigation emitter, comprising:
 a) providing a device according to claim 1;
 b) placing at least one drip irrigation emitter in said device magazine;
 c) installing said magazine in said device; and
 d) activating said plunger to drive a drip irrigation emitter from said at least one drip irrigation emitter in said magazine into a section of drip irrigation tubing.

14. A device for repeatedly installing drip irrigation emitters, the device comprising:
 a) a housing;
 b) a magazine that is adapted to contain a plurality of drip irrigation emitters;

c) a sleeve slidably disposed in said housing, wherein (i) said sleeve includes a pair of sleeve arms and an aperture at a forward end of said sleeve, (ii) said aperture is dimensioned and adapted to receive a drip irrigation emitter from said plurality of drip irrigation emitters when said plurality of drip irrigation emitters are housed within said magazine, and (iii) said sleeve comprises at least one notch in a lower surface of said pair of sleeve arms;
 d) a plunger slidably disposed between said pair of sleeve arms;
 e) at least one locking block that is dimensioned to mate with said at least one notch; and
 f) a cradle that is adapted to receive a section of a drip irrigation tubing;
 wherein said plunger is adapted to drive said drip irrigation emitter into said section of drip irrigation tubing when said drip irrigation emitter is received within said aperture and said section of drip irrigation tubing is received within said cradle;
 g) wherein said at least one locking block, once mated with said at least one notch, releasably locks said sleeve in a retracted position within said device.

15. The device of claim 14, wherein (i) said pair of sleeve arms comprise a pair of opposing slots, (ii) said plunger comprises a pin, and (iii) said pin is slidably disposed within said pair of opposing slots.

16. The device of claim 15, wherein said pin contacts a forward end in each of said pair of opposing slots when said device is activated thereby driving said sleeve towards said cradle.

17. The device of claim 14, further comprising an ejector slidably mounted within a recess in said housing, wherein said ejector occupies a port at said forward end of said sleeve under a force of a spring that is housed within said recess when (i) said device is in a resting state, and (ii) said aperture is free of said drip irrigation emitter.

18. The device of claim 17, wherein said ejector contacts and ejects said drip irrigation emitter from said aperture when said sleeve retracts into said device with said drip irrigation emitter received within said aperture.

* * * * *